United States Patent
Avedon

(10) Patent No.: US 11,703,062 B2
(45) Date of Patent: Jul. 18, 2023

(54) TEMPERATURE DESTRATIFICATION SYSTEMS

(71) Applicant: AIRIUS IP HOLDINGS, LLC, Longmont, CO (US)

(72) Inventor: Raymond B. Avedon, Boulder, CO (US)

(73) Assignee: Airius IP Holdings, LLC, Longmont, CO (US)

( * ) Notice: Subject to any disclaimer, the term of this patent is extended or adjusted under 35 U.S.C. 154(b) by 0 days.

(21) Appl. No.: 17/807,500

(22) Filed: Jun. 17, 2022

(65) Prior Publication Data

US 2023/0055245 A1 Feb. 23, 2023

Related U.S. Application Data

(63) Continuation of application No. 17/303,592, filed on Jun. 2, 2021, now Pat. No. 11,365,743, which is a
(Continued)

(51) Int. Cl.
*F04D 25/08* (2006.01)
*F04D 29/54* (2006.01)
(Continued)

(52) U.S. Cl.
CPC ............ *F04D 25/088* (2013.01); *B23P 19/00* (2013.01); *F04D 13/0613* (2013.01);
(Continued)

(58) Field of Classification Search
CPC ............ F21V 33/0096; F04D 13/0613; F04D 19/002; F04D 25/12; F04D 25/088;
(Continued)

(56) References Cited

U.S. PATENT DOCUMENTS

| 651,637 A | 6/1900 | Nicol |
| D33,522 S | 11/1900 | Brinkerhoff |

(Continued)

FOREIGN PATENT DOCUMENTS

| AU | 2013203632 | 11/2016 |
| CN | 1426729 | 7/2003 |

(Continued)

OTHER PUBLICATIONS

"Airius Model R20 EC 'Eyeball' Data Sheet", http://airius.com.au/products/new-retail-series-2/attachment/na_std_retailseries/ published Jun. 15, 2016 as printed May 23, 2017 in 1 page.
(Continued)

*Primary Examiner* — Igor Kershteyn
(74) *Attorney, Agent, or Firm* — Knobbe, Martens, Olson & Bear, LLP

(57) ABSTRACT

A temperature destratification assembly can include an outer housing. An impeller can be positioned within the outer housing between the inlet and outlet of the outer housing. The impeller can have an impeller hub and a plurality of impeller blades extending radially outward from the impeller hub. The assembly can include an impeller motor configured to rotate the impeller blades about an axis of rotation. A stator can be positioned within the outer housing between the impeller and the outlet of the outer housing. The stator can include a plurality of vanes. The stator vanes can include an upstream edge at the upstream end of the stator, a first surface extending from the upstream edge to the downstream edge of the vane, and a second surface opposite the first surface and extending from the upstream edge to the downstream edge of vane. A plurality of the vanes can have a downstream edge at the outlet of the outer housing.

15 Claims, 15 Drawing Sheets

Related U.S. Application Data continuation of application No. 16/662,957, filed on Oct. 24, 2019, now Pat. No. 11,053,948, which is a continuation of application No. 15/648,261, filed on Jul. 12, 2017, now Pat. No. 10,487,840, which is a continuation of application No. 15/480,285, filed on Apr. 5, 2017, now Pat. No. 9,714,663, which is a continuation of application No. 15/061,951, filed on Mar. 4, 2016, now Pat. No. 9,631,627, which is a continuation of application No. 13/365,223, filed on Feb. 2, 2012, now abandoned, which is a continuation-in-part of application No. 12/130,909, filed on May 30, 2008, now abandoned, which is a continuation of application No. 11/027,039, filed on Dec. 30, 2004, now Pat. No. 7,381,129.

(60) Provisional application No. 61/521,270, filed on Aug. 8, 2011, provisional application No. 60/553,720, filed on Mar. 15, 2004.

(51) Int. Cl.
*F04D 29/60* (2006.01)
*F24F 7/007* (2006.01)
*F04D 25/12* (2006.01)
*B23P 19/00* (2006.01)
*F04D 13/06* (2006.01)
*F04D 29/52* (2006.01)
*F21V 33/00* (2006.01)
*F04D 19/00* (2006.01)
*F04D 29/32* (2006.01)
*F04D 29/42* (2006.01)

(52) U.S. Cl.
CPC .......... *F04D 19/002* (2013.01); *F04D 25/12* (2013.01); *F04D 29/325* (2013.01); *F04D 29/329* (2013.01); *F04D 29/522* (2013.01); *F04D 29/542* (2013.01); *F04D 29/547* (2013.01); *F04D 29/601* (2013.01); *F21V 33/0096* (2013.01); *F24F 7/007* (2013.01); *F04D 29/4226* (2013.01); *F24F 2221/02* (2013.01); *F24F 2221/14* (2013.01)

(58) Field of Classification Search
CPC .. F04D 29/325; F04D 29/4226; F04D 29/547; F04D 29/542; F04D 29/601; F04D 29/329; F04D 29/522; F24F 2221/02; F24F 2221/14
See application file for complete search history.

(56) References Cited

U.S. PATENT DOCUMENTS

| | | |
|---|---|---|
| 818,604 A | 4/1906 | Bierd |
| 866,292 A | 9/1907 | Meston |
| 917,206 A | 4/1909 | Watts |
| 1,858,067 A | 5/1932 | Warren |
| 1,877,347 A | 9/1932 | McCurdie |
| 1,926,795 A | 9/1933 | Sassenberg |
| 2,016,778 A | 10/1935 | Hall et al. |
| 2,142,307 A | 1/1939 | De Mey et al. |
| 2,144,035 A | 1/1939 | Smith, Jr. |
| 2,154,313 A | 4/1939 | McMahan |
| 2,189,008 A | 2/1940 | Kurth |
| 2,189,502 A | 2/1940 | Johnston |
| 2,232,573 A | 2/1941 | Teves |
| 2,258,731 A | 10/1941 | Blumenthal |
| D133,120 S | 7/1942 | Spear |
| 2,300,574 A | 11/1942 | Jepertinger |
| 2,359,021 A | 9/1944 | Campbell et al. |
| 2,366,773 A | 1/1945 | Eklund et al. |
| 2,371,821 A | 3/1945 | Havis |
| D152,397 S | 1/1949 | Damond |
| 2,513,463 A | 7/1950 | Eklund et al. |
| 2,524,974 A | 10/1950 | Hickmott |
| 2,615,620 A | 10/1952 | Goettl |
| 2,632,375 A | 3/1953 | Stair et al. |
| 2,658,719 A | 11/1953 | Johanson |
| D174,230 S | 3/1955 | Lewis, II |
| 2,710,337 A | 6/1955 | Moore, Jr. |
| 2,814,433 A | 11/1957 | Brinen |
| 2,830,523 A | 4/1958 | Vehige |
| D187,699 S | 4/1960 | van Rijn |
| 2,982,198 A | 5/1961 | Mohrman |
| 3,012,494 A | 12/1961 | Drummond |
| 3,036,509 A | 5/1962 | Babbitt |
| 3,040,993 A | 6/1962 | Schultz |
| 3,068,341 A | 12/1962 | Ortiz et al. |
| 3,072,321 A | 1/1963 | King, Jr. |
| D195,287 S | 5/1963 | Downing |
| 3,099,949 A | 8/1963 | Davidson |
| 3,165,294 A | 1/1965 | Anderson |
| 3,188,007 A | 6/1965 | Myklebust |
| 3,212,425 A | 10/1965 | Lindner et al. |
| 3,246,699 A | 4/1966 | Jocz |
| 3,300,123 A | 1/1967 | Freyholdt et al. |
| 3,306,179 A | 2/1967 | Lambie et al. |
| 3,320,869 A | 5/1967 | Schach |
| 3,364,839 A | 1/1968 | Sweeney et al. |
| 3,382,791 A | 5/1968 | Henry-Biabaud |
| 3,386,368 A | 6/1968 | Fielding |
| 3,413,905 A | 12/1968 | Johnson |
| 3,524,399 A | 8/1970 | Bohanon |
| 3,584,968 A | 6/1971 | Keith |
| 3,601,184 A | 8/1971 | Hauville |
| 3,690,244 A | 9/1972 | Kallel et al. |
| 3,699,872 A | 10/1972 | Kruger |
| 3,765,317 A | 10/1973 | Lowe |
| 3,785,271 A | 1/1974 | Joy |
| 3,827,342 A | 8/1974 | Hughes |
| D232,831 S | 9/1974 | Vidmar, Jr. |
| 3,835,759 A | 9/1974 | LLoyd |
| D234,847 S | 4/1975 | Hoffman |
| 3,876,331 A | 4/1975 | DenHerder et al. |
| 3,927,300 A | 12/1975 | Wada et al. |
| 3,932,054 A | 1/1976 | McKelvey |
| 3,934,494 A | 1/1976 | Butler |
| 3,967,927 A | 7/1976 | Patterson |
| 3,973,479 A | 8/1976 | Whiteley |
| 3,988,973 A | 11/1976 | Honmann |
| 4,006,673 A | 2/1977 | Meyer et al. |
| D246,467 S | 11/1977 | Kurata |
| 4,064,427 A | 12/1977 | Hansen et al. |
| 4,123,197 A | 10/1978 | Keem et al. |
| D251,851 S | 5/1979 | Palm |
| 4,152,973 A | 5/1979 | Peterson |
| 4,162,779 A | 7/1979 | Van Steenhoven et al. |
| 4,185,545 A | 1/1980 | Rusth et al. |
| D255,488 S | 6/1980 | Kanarek |
| 4,210,833 A | 7/1980 | Neveux |
| D256,273 S | 8/1980 | Townsend et al. |
| 4,234,916 A | 11/1980 | Goralnik |
| D258,010 S | 1/1981 | Bowls et al. |
| D258,526 S | 3/1981 | Nederman |
| 4,261,255 A | 4/1981 | Anderson et al. |
| 4,321,659 A | 3/1982 | Wheeler |
| 4,344,112 A | 8/1982 | Brown |
| D269,638 S | 7/1983 | Frye, Jr. et al. |
| 4,391,570 A | 7/1983 | Stutzman |
| 4,396,352 A | 8/1983 | Pearce |
| D272,184 S | 1/1984 | Karpowicz |
| D273,793 S | 5/1984 | Nachatelo |
| D274,772 S | 7/1984 | Obland |
| 4,473,000 A | 9/1984 | Perkins |
| 4,512,242 A | 4/1985 | Bohanon, Sr. |
| 4,515,538 A | 5/1985 | Shih |
| 4,522,255 A | 6/1985 | Baker |
| 4,524,679 A | 6/1985 | Lyons |
| 4,546,420 A | 10/1985 | Wheeler et al. |
| 4,548,548 A | 10/1985 | Gray, III |

(56) References Cited

U.S. PATENT DOCUMENTS

| | | |
|---|---|---|
| 4,550,649 A | 11/1985 | Zambolin |
| D283,054 S | 3/1986 | Altman |
| 4,630,182 A | 12/1986 | Moroi et al. |
| 4,657,483 A | 4/1987 | Bede |
| 4,657,485 A | 4/1987 | Hartwig |
| 4,662,912 A | 5/1987 | Perkins |
| 4,678,410 A | 7/1987 | Kullen |
| 4,681,024 A | 7/1987 | Ivey |
| D291,488 S | 8/1987 | Delmas |
| 4,692,091 A | 9/1987 | Ritenour |
| D293,029 S | 12/1987 | Shwisha |
| 4,714,230 A | 12/1987 | Huang |
| 4,715,784 A | 12/1987 | Mosiewicz |
| 4,716,818 A | 1/1988 | Brown |
| 4,730,551 A | 3/1988 | Peludat |
| 4,750,863 A | 6/1988 | Scoggins |
| 4,790,863 A | 12/1988 | Nobiraki et al. |
| 4,794,851 A | 1/1989 | Kurrle |
| 4,796,343 A | 1/1989 | Wing |
| 4,848,669 A | 7/1989 | George |
| 4,850,265 A | 7/1989 | Raisanen |
| 4,890,547 A | 1/1990 | Wagner et al. |
| 4,895,065 A | 1/1990 | Lamparter |
| D308,416 S | 6/1990 | Brumbach |
| 4,930,987 A | 6/1990 | Stahl |
| 4,971,143 A | 11/1990 | Hogan |
| 4,973,016 A | 11/1990 | Hertenstein |
| D312,875 S | 12/1990 | Spock |
| D314,619 S | 2/1991 | Beavers et al. |
| 5,000,081 A | 3/1991 | Gilmer |
| 5,021,932 A | 6/1991 | Ivey |
| 5,033,711 A | 7/1991 | Gregorich et al. |
| 5,042,366 A | 8/1991 | Panetski et al. |
| 5,060,901 A | 10/1991 | Lathrop et al. |
| 5,078,574 A | 1/1992 | Olsen |
| 5,094,676 A | 3/1992 | Karbacher |
| D325,628 S | 4/1992 | Cho |
| 5,107,755 A | 4/1992 | Leban et al. |
| 5,121,675 A | 6/1992 | Muller et al. |
| 5,127,876 A | 7/1992 | Howe et al. |
| D328,405 S | 8/1992 | Heiligenstein et al. |
| 5,152,606 A | 10/1992 | Borraccia et al. |
| 5,156,568 A | 10/1992 | Ricci |
| 5,191,618 A | 3/1993 | Hisey |
| D335,532 S | 5/1993 | Lopez |
| D337,157 S | 7/1993 | Ortiz |
| D340,765 S | 10/1993 | Joss et al. |
| 5,251,461 A | 10/1993 | Fallows, III et al. |
| D347,467 S | 5/1994 | Medvick |
| 5,328,152 A | 7/1994 | Castle |
| 5,358,443 A | 10/1994 | Mitchell et al. |
| 5,399,119 A | 3/1995 | Birk et al. |
| 5,423,660 A | 6/1995 | Sortor |
| 5,429,481 A | 7/1995 | Liu |
| 5,439,349 A | 8/1995 | Kupferberg |
| 5,439,352 A | 8/1995 | Line |
| 5,443,625 A | 8/1995 | Schaffhausen |
| 5,458,505 A | 10/1995 | Prager |
| 5,462,484 A | 10/1995 | Jung et al. |
| 5,466,120 A | 11/1995 | Takeuchi et al. |
| 5,484,076 A | 1/1996 | Petrushka |
| 5,511,942 A | 4/1996 | Meier |
| 5,513,953 A * | 5/1996 | Hansen ............... F24F 7/10 415/213.1 |
| 5,520,515 A | 5/1996 | Bailey et al. |
| 5,545,241 A | 8/1996 | Vanderauwera et al. |
| 5,547,343 A | 8/1996 | Jané et al. |
| 5,551,841 A | 9/1996 | Kamada |
| 5,561,952 A | 10/1996 | Damron |
| 5,569,019 A | 10/1996 | Katariya et al. |
| 5,584,656 A | 12/1996 | Rose |
| 5,595,068 A | 1/1997 | Amr |
| 5,613,833 A | 3/1997 | Wolfe et al. |
| 5,658,196 A | 8/1997 | Swaim |
| 5,664,872 A | 9/1997 | Spearman et al. |
| D386,267 S | 11/1997 | Tickner |
| 5,709,458 A | 1/1998 | Metz |
| 5,725,190 A | 3/1998 | Cuthbertson et al. |
| 5,725,356 A | 3/1998 | Carter |
| 5,782,438 A | 7/1998 | Hubben et al. |
| 5,791,985 A | 8/1998 | Schiedegger et al. |
| 5,822,186 A | 10/1998 | Bull |
| D404,617 S | 1/1999 | Mick et al. |
| D407,696 S | 4/1999 | Shimazu |
| 5,918,972 A | 7/1999 | Van Belle |
| 5,934,783 A | 8/1999 | Yoshikawa |
| 5,938,527 A | 8/1999 | Oshima et al. |
| D414,550 S | 9/1999 | Bloom |
| 5,947,816 A | 9/1999 | Schiedegger et al. |
| 5,967,891 A | 10/1999 | Riley et al. |
| 5,975,853 A | 11/1999 | Lackey |
| 5,984,252 A | 11/1999 | Bograng et al. |
| 5,997,253 A | 12/1999 | Fechan |
| 6,004,097 A | 12/1999 | Wark et al. |
| 6,068,385 A | 5/2000 | Hsieh |
| D427,673 S | 7/2000 | Stout, Jr. |
| 6,095,671 A | 8/2000 | Hutain |
| 6,109,874 A | 8/2000 | Steiner |
| 6,145,798 A | 11/2000 | Janisse et al. |
| 6,149,513 A | 11/2000 | Lyu |
| 6,155,782 A | 12/2000 | Hsu |
| 6,168,517 B1 | 1/2001 | Cook |
| 6,176,680 B1 | 1/2001 | Ringblom et al. |
| 6,183,203 B1 | 2/2001 | Grintz |
| 6,192,702 B1 | 2/2001 | Shimogori |
| 6,193,384 B1 | 2/2001 | Stein |
| 6,196,915 B1 | 3/2001 | Schiedegger et al. |
| D443,053 S | 5/2001 | Schaefer |
| 6,319,304 B1 | 11/2001 | Moredock |
| D453,960 S | 2/2002 | Shelby et al. |
| 6,352,473 B1 | 3/2002 | Clark |
| 6,357,714 B1 | 3/2002 | Johnson |
| 6,360,816 B1 | 3/2002 | Wagner |
| 6,361,428 B1 | 3/2002 | Tosconi et al. |
| 6,361,431 B1 | 3/2002 | Kawano |
| 6,364,760 B1 | 4/2002 | Rooney |
| D457,142 S | 5/2002 | Chang |
| D457,452 S | 5/2002 | Christiansen |
| D457,613 S | 5/2002 | Schaefer |
| 6,382,911 B1 | 5/2002 | Beltowski |
| 6,383,072 B2 | 5/2002 | Schiedegger et al. |
| 6,384,494 B1 | 5/2002 | Avidano et al. |
| 6,386,828 B1 | 5/2002 | Davis et al. |
| 6,386,970 B1 | 5/2002 | Vernier, II et al. |
| 6,386,972 B1 | 5/2002 | Schiedegger et al. |
| 6,435,964 B1 | 8/2002 | Chang |
| 6,451,080 B1 | 9/2002 | Rocklitz et al. |
| 6,458,028 B2 | 10/2002 | Snyder |
| 6,458,628 B1 | 10/2002 | Distefano et al. |
| 6,484,524 B1 | 11/2002 | Ulanov |
| D470,066 S | 2/2003 | Christiansen |
| D470,731 S | 2/2003 | Hipgrave et al. |
| 6,551,185 B1 | 4/2003 | Miyake et al. |
| 6,575,011 B1 | 6/2003 | Busby |
| 6,581,974 B1 | 6/2003 | Ragner et al. |
| 6,582,291 B2 | 6/2003 | Clark |
| 6,592,328 B1 | 7/2003 | Cahill |
| 6,595,747 B2 | 7/2003 | Bos |
| D480,132 S | 9/2003 | Stout, Jr. |
| 6,626,003 B1 | 9/2003 | Kortüm et al. |
| 6,626,636 B2 | 9/2003 | Bohn |
| D481,101 S | 10/2003 | Boehrs et al. |
| D481,127 S | 10/2003 | Hayamizu |
| D481,159 S | 10/2003 | Walker |
| 6,648,752 B2 | 11/2003 | Vernier, II et al. |
| 6,679,433 B2 | 1/2004 | Gordon et al. |
| 6,682,308 B1 | 1/2004 | Fei et al. |
| 6,700,266 B2 | 3/2004 | Winkel et al. |
| D489,967 S | 5/2004 | Funk |
| 6,761,531 B2 | 7/2004 | Toye |
| 6,767,281 B2 | 7/2004 | McKee |
| 6,783,578 B2 | 8/2004 | Tillman, Jr. |
| 6,804,627 B1 | 10/2004 | Marokhovsky et al. |
| 6,805,627 B2 | 10/2004 | Marts et al. |

(56) References Cited

U.S. PATENT DOCUMENTS

| | | |
|---|---|---|
| 6,812,849 B1 | 11/2004 | Ancel |
| D500,773 S | 1/2005 | Colson et al. |
| D505,627 S | 5/2005 | Py et al. |
| 6,886,270 B2 | 5/2005 | Gilmer |
| 6,916,240 B1 | 7/2005 | Morton |
| 6,938,631 B2 | 9/2005 | Gridley |
| 6,941,698 B2 | 9/2005 | Telles |
| 6,951,081 B2 | 10/2005 | Bonshor |
| 6,966,830 B2 | 11/2005 | Hurlstone et al. |
| 6,974,381 B1 | 12/2005 | Walker et al. |
| D514,688 S | 2/2006 | Avedon |
| 7,011,500 B2 | 3/2006 | Matson |
| 7,011,578 B1 | 3/2006 | Core |
| 7,044,849 B2 | 5/2006 | Dippel |
| 7,048,499 B2 | 5/2006 | Mathson et al. |
| 7,056,092 B2 | 6/2006 | Stahl |
| 7,056,368 B2 | 6/2006 | Moredock et al. |
| D525,725 S | 7/2006 | Foo |
| 7,101,064 B2 | 9/2006 | Ancel |
| D532,229 S | 11/2006 | Hoernig et al. |
| 7,152,425 B2 | 12/2006 | Han et al. |
| 7,166,023 B2 | 1/2007 | Haigh et al. |
| 7,175,309 B2 | 2/2007 | Craw et al. |
| 7,185,504 B2 | 3/2007 | Kasai et al. |
| 7,201,110 B1 | 4/2007 | Pawlak |
| 7,201,650 B2 | 4/2007 | Demerath et al. |
| 7,214,035 B2 | 5/2007 | Bussieres et al. |
| 7,246,997 B2 | 7/2007 | Liu et al. |
| D552,485 S | 10/2007 | Grabiner et al. |
| 7,287,738 B2 | 10/2007 | Pitlor |
| 7,288,023 B2 | 10/2007 | Leopold |
| D557,791 S | 12/2007 | Cox |
| 7,311,492 B2 | 12/2007 | Östberg |
| 7,320,636 B2 | 1/2008 | Seliger et al. |
| 7,331,764 B1 | 2/2008 | Reynolds et al. |
| D564,120 S | 3/2008 | Layne et al. |
| D567,930 S | 4/2008 | Smith |
| D567,961 S | 4/2008 | Yajima |
| 7,374,408 B2 | 5/2008 | Savage et al. |
| D570,981 S | 6/2008 | McClelland |
| 7,381,129 B2 * | 6/2008 | Avedon ................ F04D 29/542 |
| | | 416/247 R |
| D578,390 S | 10/2008 | Green |
| D582,502 S | 12/2008 | Brittingham |
| D583,451 S | 12/2008 | Aloe et al. |
| D583,452 S | 12/2008 | Aloe et al. |
| 7,467,931 B2 | 12/2008 | O'Toole |
| D584,786 S | 1/2009 | Brittingham |
| 7,473,074 B2 | 1/2009 | Herbst et al. |
| 7,476,079 B2 | 1/2009 | Bartlett |
| 7,484,863 B1 | 2/2009 | Aubrey |
| 7,497,773 B1 | 3/2009 | Schmidt |
| D591,382 S | 4/2009 | Brittingham |
| 7,516,578 B2 | 4/2009 | Bonshor |
| 7,544,124 B2 | 6/2009 | Polston |
| 7,549,258 B2 | 6/2009 | Lajewski |
| 7,566,034 B2 | 7/2009 | Bonshor |
| D599,471 S | 9/2009 | Borovicka et al. |
| D600,396 S | 9/2009 | Luinstra |
| 7,607,935 B2 | 10/2009 | Dahl |
| D604,880 S | 11/2009 | Lovegrove |
| 7,610,717 B2 | 11/2009 | Lüken et al. |
| 7,610,726 B2 | 11/2009 | Lajewski |
| D605,332 S | 12/2009 | Miranda |
| 7,645,188 B1 | 1/2010 | Peerbolt |
| 7,651,390 B1 | 1/2010 | Profeta et al. |
| D612,925 S | 3/2010 | Kameyama et al. |
| 7,677,770 B2 | 3/2010 | Mazzochette |
| 7,677,964 B1 | 3/2010 | Bucher et al. |
| 7,708,625 B2 | 5/2010 | Leseman et al. |
| 7,717,674 B2 | 5/2010 | Tsuji et al. |
| D617,890 S | 6/2010 | Thomas |
| D620,096 S | 7/2010 | Underwood |
| 7,748,954 B2 | 7/2010 | Eguchi et al. |
| 7,752,814 B2 | 7/2010 | Bonshor |
| D621,985 S | 8/2010 | Sanoner |
| D622,895 S | 8/2010 | Lyons |
| 7,774,999 B2 | 8/2010 | McKee |
| 7,780,510 B2 | 8/2010 | Polston |
| 7,785,064 B2 | 8/2010 | Bartholmey et al. |
| D625,855 S | 10/2010 | Franklin |
| D625,856 S | 10/2010 | Franklin |
| 7,849,644 B2 | 12/2010 | Melesky |
| D630,337 S | 1/2011 | Chia et al. |
| D630,536 S | 1/2011 | Pettit |
| D631,142 S | 1/2011 | Angell |
| D631,148 S | 1/2011 | Benton et al. |
| D631,579 S | 1/2011 | Franklin |
| D631,580 S | 1/2011 | Franklin |
| D631,581 S | 1/2011 | Franklin |
| 7,901,278 B2 | 3/2011 | O'Hagin |
| 7,930,858 B2 | 4/2011 | Lajewski |
| 7,942,627 B2 * | 5/2011 | Jin ........................ F04D 29/542 |
| | | 415/209.1 |
| D645,550 S | 9/2011 | Ferroni |
| D645,561 S | 9/2011 | Herrmann et al. |
| D645,593 S | 9/2011 | Janssen |
| 8,052,386 B1 | 11/2011 | Fitzpatrick et al. |
| D651,709 S | 1/2012 | Zeyfang |
| D651,919 S | 1/2012 | Lai et al. |
| D651,920 S | 1/2012 | Lai et al. |
| D661,902 S | 6/2012 | Italiano |
| 8,215,789 B2 | 7/2012 | Howard |
| 8,282,138 B2 | 10/2012 | Steiner |
| 8,297,945 B2 | 10/2012 | Spaggiari |
| D672,863 S | 12/2012 | Romero Carreras |
| D676,877 S | 2/2013 | Drenth et al. |
| 1,053,025 A1 | 2/2013 | Goodwin |
| 8,366,387 B2 | 2/2013 | Reuter |
| D678,791 S | 3/2013 | Ford |
| D681,184 S | 4/2013 | Romero Carreras |
| D684,307 S | 6/2013 | Teller |
| 8,459,846 B2 | 6/2013 | Tsao |
| 8,487,517 B2 | 7/2013 | Fang et al. |
| 8,529,324 B2 | 9/2013 | Moredock et al. |
| 8,535,128 B2 | 9/2013 | Chwala |
| 8,596,596 B2 | 12/2013 | Naji et al. |
| 8,616,842 B2 | 12/2013 | Avedon |
| D698,916 S | 2/2014 | Avedon |
| 8,641,375 B2 | 2/2014 | Tian et al. |
| D702,887 S | 4/2014 | Peiruccelli |
| D703,302 S | 4/2014 | Ruck |
| D703,579 S | 4/2014 | Kuster et al. |
| D709,643 S | 7/2014 | Kohler et al. |
| D710,485 S | 8/2014 | Nudo |
| D710,490 S | 8/2014 | Shurtleff |
| D711,843 S | 8/2014 | Yamazaki et al. |
| D714,996 S | 10/2014 | Trotter et al. |
| D715,904 S | 10/2014 | Tate et al. |
| 8,894,354 B2 | 11/2014 | Hodgson et al. |
| 8,899,930 B2 | 12/2014 | Innocenti et al. |
| D721,645 S | 1/2015 | Brown |
| 8,931,936 B1 | 1/2015 | Tham et al. |
| D722,486 S | 2/2015 | Wang |
| D724,199 S | 3/2015 | Bambot et al. |
| D725,053 S | 3/2015 | Kaneko et al. |
| D725,055 S | 3/2015 | Yamazaki et al. |
| 8,967,983 B2 | 3/2015 | Kampf |
| 8,992,174 B2 | 3/2015 | Chang |
| D730,185 S | 5/2015 | Blanco et al. |
| 9,028,085 B2 | 5/2015 | Todd, Jr. |
| 9,028,211 B2 | 5/2015 | Todd, Jr. |
| D731,030 S | 6/2015 | Tyler |
| D733,555 S | 7/2015 | Brady et al. |
| D739,223 S | 9/2015 | Paik et al. |
| D739,515 S | 9/2015 | Johnson et al. |
| D739,832 S | 9/2015 | Yamazaki et al. |
| D740,973 S | 10/2015 | Gonzalez |
| 9,151,295 B2 | 10/2015 | Avedon |
| D742,508 S | 11/2015 | Row et al. |
| D742,563 S | 11/2015 | Kasha |
| D743,521 S | 11/2015 | Jackson |
| D746,416 S | 12/2015 | Barlar |
| D746,971 S | 1/2016 | Avedon |

(56) References Cited

U.S. PATENT DOCUMENTS

| | | |
|---|---|---|
| D747,453 S | 1/2016 | Stewart et al. |
| D752,339 S | 3/2016 | Hoover |
| D753,817 S | 4/2016 | Maguire et al. |
| D753,818 S | 4/2016 | Maguire et al. |
| D754,312 S | 4/2016 | Ellis |
| D755,438 S | 5/2016 | Kimmet |
| D756,494 S | 5/2016 | Gledhill et al. |
| D756,498 S | 5/2016 | Norman et al. |
| 9,335,061 B2 | 5/2016 | Avedon |
| D758,642 S | 6/2016 | Eguchi |
| D760,384 S | 6/2016 | Niunoya et al. |
| D761,419 S | 7/2016 | Fitzgerald et al. |
| D766,098 S | 9/2016 | Seo |
| D766,100 S | 9/2016 | Jung |
| D768,844 S | 10/2016 | Koseoglu |
| 9,459,020 B2 | 10/2016 | Avedon |
| D772,531 S | 11/2016 | Troia |
| D774,689 S | 12/2016 | Terumichi |
| D775,719 S | 1/2017 | Smith et al. |
| D777,311 S | 1/2017 | Chen |
| D783,795 S | 4/2017 | Avedon |
| 9,631,627 B2 | 4/2017 | Avedon |
| D788,886 S | 6/2017 | Salzer |
| D788,953 S | 6/2017 | Khan |
| 9,696,026 B1 | 7/2017 | Hardgrave |
| 9,702,576 B2 | 7/2017 | Avedon |
| 9,714,663 B1 | 7/2017 | Avedon |
| D794,198 S | 8/2017 | Mizumura et al. |
| D794,199 S | 8/2017 | Mizumura et al. |
| D798,718 S | 10/2017 | Foster et al. |
| D799,014 S | 10/2017 | Suarez et al. |
| D799,675 S | 10/2017 | Wong |
| D800,174 S | 10/2017 | Ghalsasi et al. |
| D801,510 S | 10/2017 | O'Connett et al. |
| D801,545 S | 10/2017 | Wiesli et al. |
| D803,381 S | 11/2017 | Kim et al. |
| D805,176 S | 12/2017 | Avedon |
| D818,185 S | 5/2018 | Wilson |
| 9,970,457 B2 | 5/2018 | Avedon |
| D820,967 S | 6/2018 | Avedon |
| 10,024,531 B2 | 7/2018 | Avedon |
| D824,716 S | 8/2018 | Elgamil et al. |
| D825,090 S | 8/2018 | Richardson et al. |
| D831,484 S | 10/2018 | Jung et al. |
| D835,265 S | 12/2018 | Inoue |
| D836,238 S | 12/2018 | Ericson, Jr. et al. |
| D838,379 S | 1/2019 | Trump |
| 10,184,489 B2 | 1/2019 | Avedon |
| D840,009 S | 2/2019 | Suarez et al. |
| D841,452 S | 2/2019 | Conselvan |
| D844,126 S | 3/2019 | Sheng et al. |
| D844,128 S | 3/2019 | Li |
| 10,221,861 B2 | 3/2019 | Avedon |
| D845,461 S | 4/2019 | Li |
| D845,462 S | 4/2019 | Li |
| D847,967 S | 5/2019 | Hernández et al. |
| D848,295 S | 5/2019 | Johnson et al. |
| D850,727 S | 6/2019 | Petruccelli |
| D852,143 S | 6/2019 | Ku |
| D853,017 S | 7/2019 | Rioux et al. |
| D861,979 S | 10/2019 | Sibley |
| D862,795 S | 10/2019 | Caldas |
| D865,223 S | 10/2019 | Spork et al. |
| D865,907 S | 11/2019 | Wagner |
| D868,254 S | 11/2019 | Lintula et al. |
| 10,487,840 B2 | 11/2019 | Avedon |
| 10,487,852 B2 | 11/2019 | Avedon |
| D869,275 S | 12/2019 | Taunk |
| D870,778 S | 12/2019 | Johnson |
| D871,535 S | 12/2019 | Ferrer |
| D872,911 S | 1/2020 | Chen |
| D877,917 S | 3/2020 | Schill |
| D880,098 S | 3/2020 | Harrison et al. |
| D881,374 S | 4/2020 | Schoettle |
| D885,550 S | 5/2020 | Avedon |
| 10,641,506 B2 | 5/2020 | Avedon |
| 10,655,841 B2 | 5/2020 | Avedon |
| D886,275 S | 6/2020 | Avedon |
| D887,541 S | 6/2020 | Avedon |
| 10,724,542 B2 | 7/2020 | Avedon |
| D895,784 S | 9/2020 | Wang |
| 11,053,948 B2 | 7/2021 | Avedon |
| D926,963 S | 8/2021 | Avedon |
| 11,092,330 B2 | 8/2021 | Avedon |
| 11,105,341 B2 | 8/2021 | Avedon |
| 11,221,153 B2 | 1/2022 | Avedon |
| 11,236,766 B2 | 2/2022 | Avedon |
| D953,517 S | 5/2022 | Belozerova et al. |
| 11,365,743 B2 | 6/2022 | Avedon |
| 11,421,710 B2 | 8/2022 | Avedon |
| 2001/0049927 A1 | 12/2001 | Toepel |
| 2002/0045420 A1 | 4/2002 | Taillon |
| 2002/0131865 A1 | 9/2002 | Larzelere et al. |
| 2002/0137454 A1 | 9/2002 | Baker |
| 2003/0026691 A1* | 2/2003 | Huang ................ F04D 29/703 415/121.2 |
| 2003/0092373 A1 | 5/2003 | Kuo |
| 2003/0213883 A1 | 11/2003 | Fu-Liang |
| 2004/0004173 A1 | 1/2004 | Johnson |
| 2004/0050077 A1 | 3/2004 | Kasai et al. |
| 2004/0052641 A1 | 3/2004 | Chen |
| 2004/0240214 A1 | 12/2004 | Whitlow et al. |
| 2004/0253095 A1 | 12/2004 | Sasaki et al. |
| 2005/0045793 A1 | 3/2005 | Johnson et al. |
| 2005/0077446 A1 | 4/2005 | Bacon et al. |
| 2005/0092888 A1 | 5/2005 | Gonce |
| 2005/0159101 A1 | 7/2005 | Hrdina et al. |
| 2005/0202776 A1 | 9/2005 | Avedon |
| 2006/0087810 A1 | 4/2006 | Rockenfeller |
| 2006/0146542 A1 | 7/2006 | Sullivan |
| 2006/0172688 A1 | 8/2006 | Johnson |
| 2006/0193139 A1 | 8/2006 | Sun et al. |
| 2006/0276123 A1 | 12/2006 | Sanagi et al. |
| 2006/0278766 A1 | 12/2006 | Wang |
| 2006/0284435 A1 | 12/2006 | Vitito |
| 2007/0213003 A1 | 9/2007 | Railkar et al. |
| 2007/0231145 A1 | 10/2007 | Jin |
| 2007/0246579 A1 | 10/2007 | Blateri |
| 2007/0297906 A1 | 12/2007 | Wu |
| 2007/0297912 A1 | 12/2007 | Reuter |
| 2008/0019836 A1 | 1/2008 | Butz et al. |
| 2008/0061200 A1 | 3/2008 | Bouissiere |
| 2008/0188175 A1 | 8/2008 | Wilkins |
| 2008/0227381 A1 | 9/2008 | Avedon |
| 2009/0041580 A1 | 2/2009 | Wichmann et al. |
| 2009/0122516 A1 | 5/2009 | Yang |
| 2009/0155080 A1 | 6/2009 | Yu |
| 2009/0170421 A1 | 7/2009 | Adrian et al. |
| 2009/0219727 A1 | 9/2009 | Weaver |
| 2009/0262550 A1 | 10/2009 | Inoue |
| 2010/0009621 A1 | 1/2010 | Hsieh |
| 2010/0052495 A1 | 3/2010 | Liu et al. |
| 2010/0075588 A1 | 3/2010 | Haneline |
| 2010/0111698 A1 | 5/2010 | Wiedman et al. |
| 2010/0176706 A1 | 7/2010 | Fu et al. |
| 2010/0192611 A1 | 8/2010 | Yamaguchi et al. |
| 2010/0202932 A1 | 8/2010 | Danville |
| 2010/0232168 A1 | 9/2010 | Horng |
| 2010/0266400 A1 | 10/2010 | Avedon |
| 2010/0295436 A1 | 11/2010 | Horng et al. |
| 2010/0328881 A1 | 12/2010 | Huang |
| 2010/0329885 A1 | 12/2010 | Criner et al. |
| 2011/0037368 A1 | 2/2011 | Huang |
| 2011/0057551 A1 | 3/2011 | Lee et al. |
| 2011/0057552 A1 | 3/2011 | Weaver |
| 2011/0080096 A1 | 4/2011 | Dudik et al. |
| 2011/0084586 A1 | 4/2011 | Lain et al. |
| 2011/0133622 A1 | 6/2011 | Mo et al. |
| 2011/0140588 A1 | 6/2011 | Chen |
| 2011/0223016 A1 | 9/2011 | Ediger et al. |
| 2011/0228967 A1 | 9/2011 | Kulchy et al. |
| 2012/0060453 A1 | 3/2012 | Holzmann et al. |
| 2012/0062095 A1 | 3/2012 | Horng |
| 2012/0194054 A1 | 8/2012 | Johnston |

(56) References Cited

U.S. PATENT DOCUMENTS

| | | |
|---|---|---|
| 2012/0195749 A1 | 8/2012 | Avedon |
| 2013/0011254 A1 | 1/2013 | Avedon |
| 2013/0023195 A1 | 1/2013 | Avedon |
| 2013/0027950 A1 | 1/2013 | Avedon |
| 2013/0111721 A1 | 5/2013 | Mahfoudh et al. |
| 2013/0196588 A1 | 8/2013 | Liao |
| 2014/0314560 A1 | 10/2014 | Avedon |
| 2014/0348634 A1 | 11/2014 | Bourrilhon et al. |
| 2015/0021013 A1 | 1/2015 | Batarseh |
| 2015/0176834 A1 | 6/2015 | Avedon |
| 2015/0176851 A1 | 6/2015 | Avedon |
| 2015/0354578 A1 | 12/2015 | Avedon |
| 2016/0107200 A1 | 4/2016 | Al-Shafei et al. |
| 2016/0146222 A1 | 5/2016 | Avedon |
| 2016/0186765 A1 | 6/2016 | Avedon |
| 2016/0238029 A1 | 8/2016 | Avedon |
| 2017/0370363 A1 | 12/2017 | Avedon |
| 2018/0149380 A1 | 5/2018 | Avedon |
| 2018/0335049 A1 | 11/2018 | Gu et al. |
| 2019/0010961 A1 | 1/2019 | Kumaou |
| 2019/0011121 A1 | 1/2019 | Avedon |
| 2019/0285088 A1 | 9/2019 | Avedon |
| 2020/0166053 A1 | 5/2020 | Avedon |
| 2020/0217530 A1 | 7/2020 | Avedon |
| 2020/0333027 A1 | 10/2020 | Avedon |
| 2020/0378594 A1 | 12/2020 | Avedon |
| 2021/0007449 A1 | 1/2021 | Udagawa |
| 2021/0040960 A1* | 2/2021 | Shih .................. F04D 29/522 |
| 2021/0062827 A1 | 3/2021 | Avedon |
| 2021/0277914 A1 | 9/2021 | Lu et al. |
| 2021/0396248 A1 | 12/2021 | Gao |
| 2022/0120469 A1 | 4/2022 | Doat et al. |
| 2022/0220975 A1 | 7/2022 | Avedon |

FOREIGN PATENT DOCUMENTS

| | | |
|---|---|---|
| CN | 101592328 | 12/2009 |
| CN | 201560963 | 8/2010 |
| DE | 44 13 542 | 10/1995 |
| DE | 196 38 518 | 4/1998 |
| DE | 10 2008 044874 | 3/2010 |
| EP | 0 037 958 | 10/1981 |
| EP | 0 212 749 | 3/1987 |
| EP | 0 772 007 | 5/1997 |
| EP | 2 248 692 | 11/2010 |
| FR | 0 715 101 | 11/1931 |
| FR | 2 784 423 | 4/2000 |
| GB | 190617978 | 5/1907 |
| GB | 0 792 369 | 3/1958 |
| GB | 0 824 390 | 11/1959 |
| GB | 0 981 188 | 1/1965 |
| GB | 1 251 880 | 11/1971 |
| GB | 2 344 619 | 6/2000 |
| GB | 2 468 504 | 9/2010 |
| JP | 55-032965 | 3/1980 |
| JP | 61-502267 | 10/1986 |
| JP | 01-067548 | 3/1989 |
| JP | 07-167097 | 7/1995 |
| JP | 07-253231 | 10/1995 |
| JP | 08-219939 | 8/1996 |
| JP | 11-132543 | 5/1999 |
| JP | 2001-193979 | 7/2001 |
| JP | 2002-349489 | 12/2002 |
| JP | 2006-350237 | 12/2006 |
| JP | 2010-181124 | 8/2010 |
| KR | 20-0176664 | 4/2000 |
| KR | 2003-0025428 | 3/2003 |
| KR | 10-1255739 | 4/2013 |
| RU | 2400254 C2 | 9/2010 |
| TW | M337636 | 8/2008 |
| WO | WO 01/034983 | 5/2001 |
| WO | WO 03/040572 | 5/2003 |
| WO | WO 2005/091896 | 10/2005 |
| WO | WO 2006/078102 | 7/2006 |
| WO | WO 2008/062319 | 5/2008 |
| WO | WO 2010/046536 | 4/2010 |
| WO | WO 2010/114702 | 10/2010 |
| WO | WO 2011/067430 | 6/2011 |
| WO | WO 2012/174155 | 12/2012 |
| WO | WO 2012/174156 | 12/2012 |
| WO | WO 2015/187856 | 12/2015 |
| WO | WO 2016/081693 | 5/2016 |
| WO | WO 2020/214729 | 10/2020 |

OTHER PUBLICATIONS

Keeler Hardware, "OC Oval Cylinder Escutcheon", https://www.keelerhardware.com.au/products/oc-oval-cylinder-escutcheon as printed Nov. 13, 2017 in 3 pages.

"The New Airius Q50 EC", https://web.archive.org/web/20150721185407/http://airius.com.au/technical/specification-sheets/the-new-airius-q50-ec/ as archived Jul. 21, 2015, pp. 2.

* cited by examiner

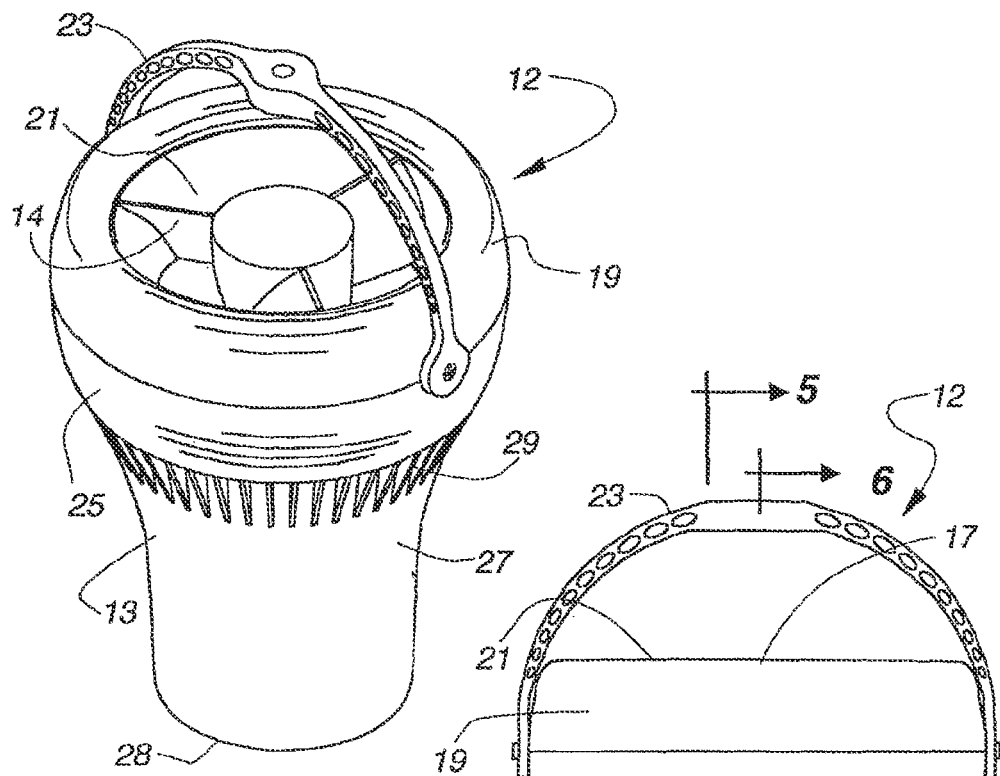
Fig. 1
Fig. 2
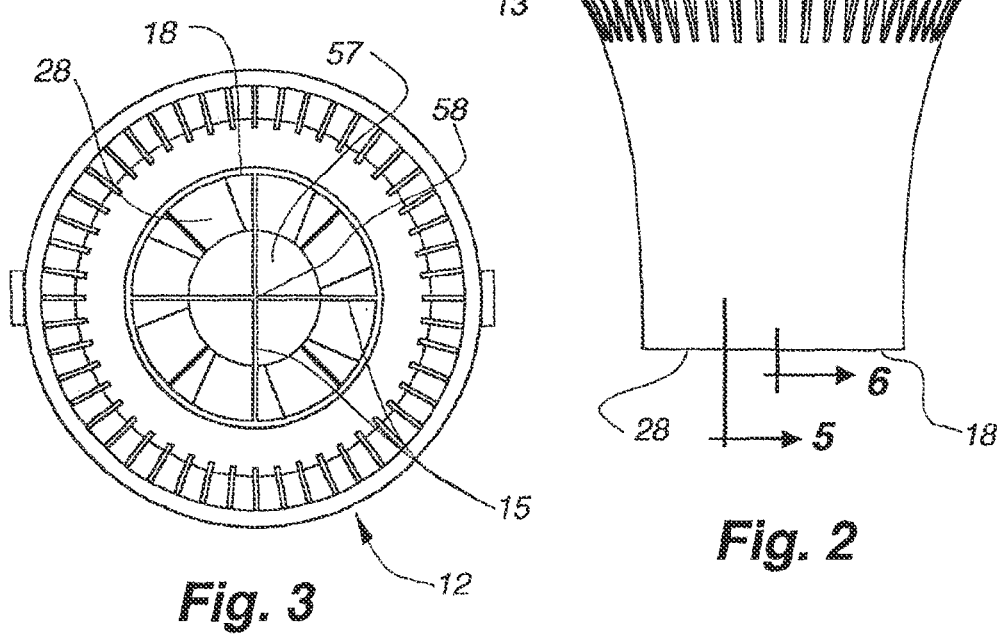
Fig. 3

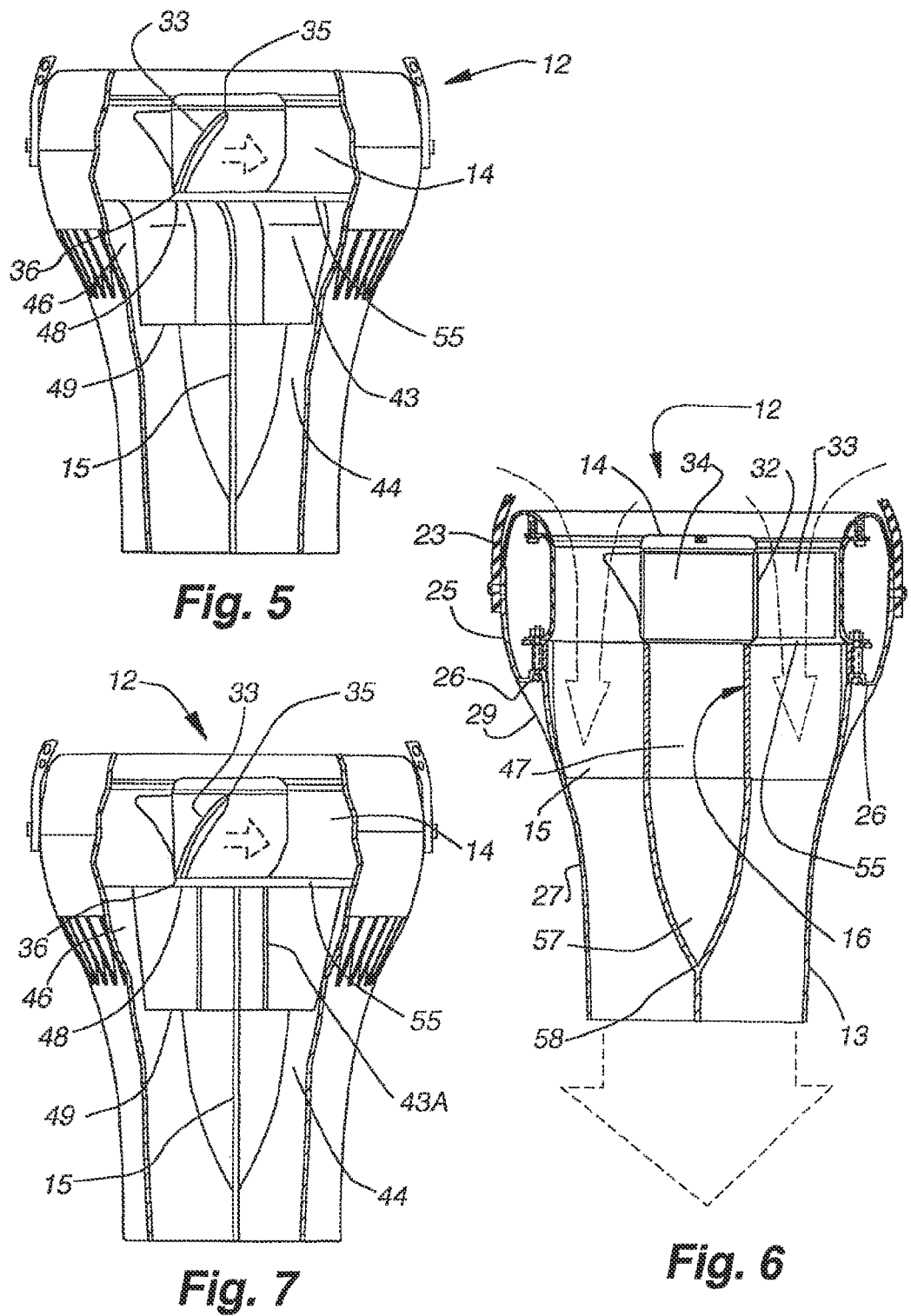

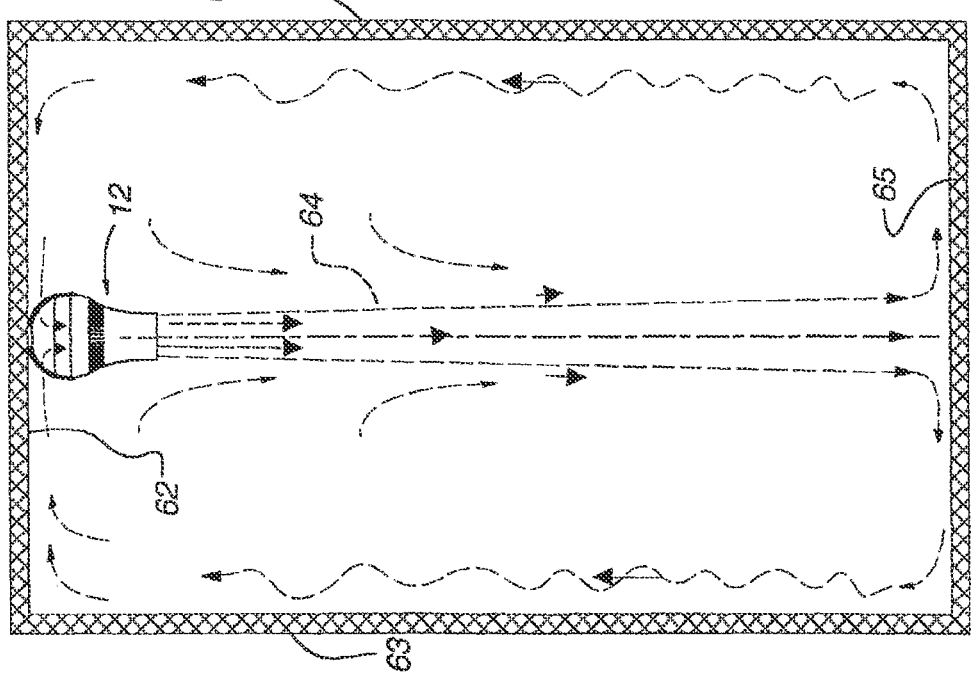
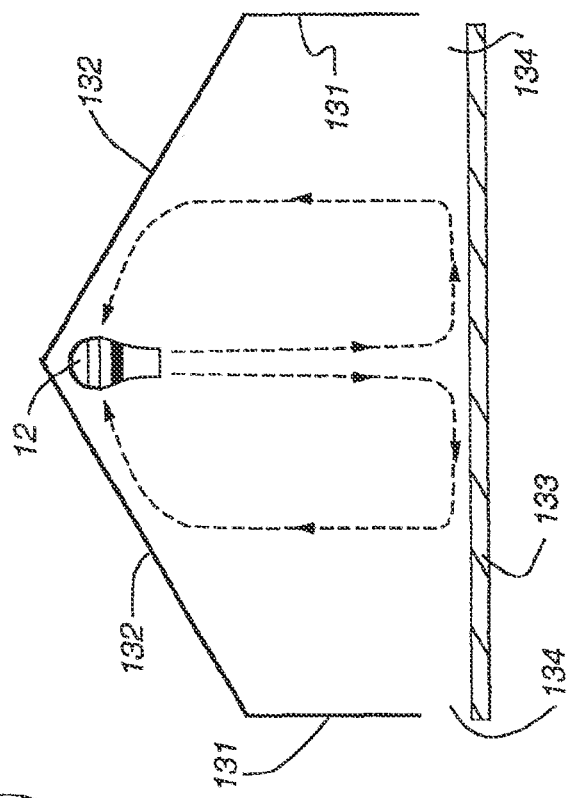

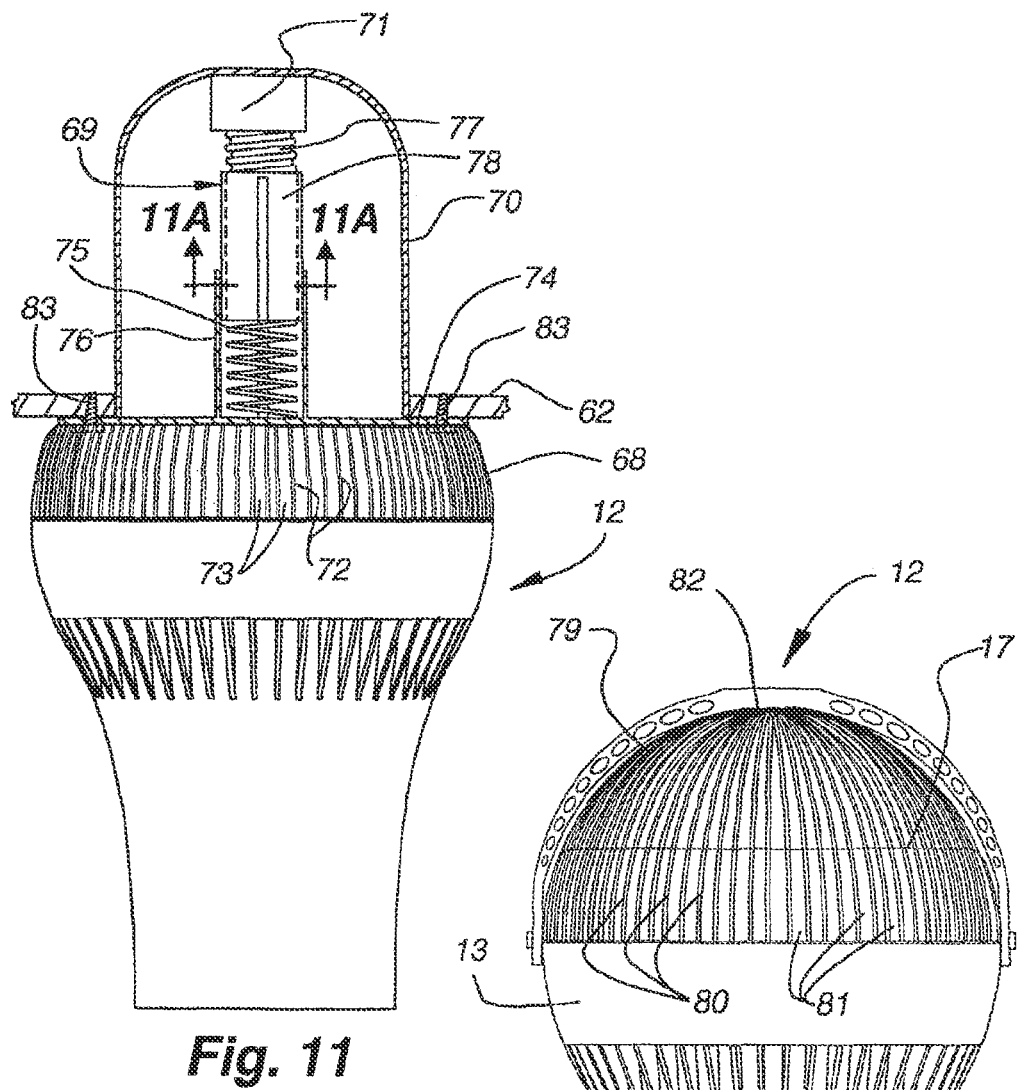
Fig. 11
Fig. 12
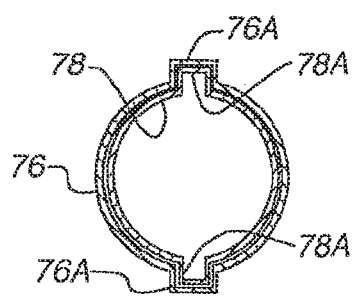
Fig. 11A

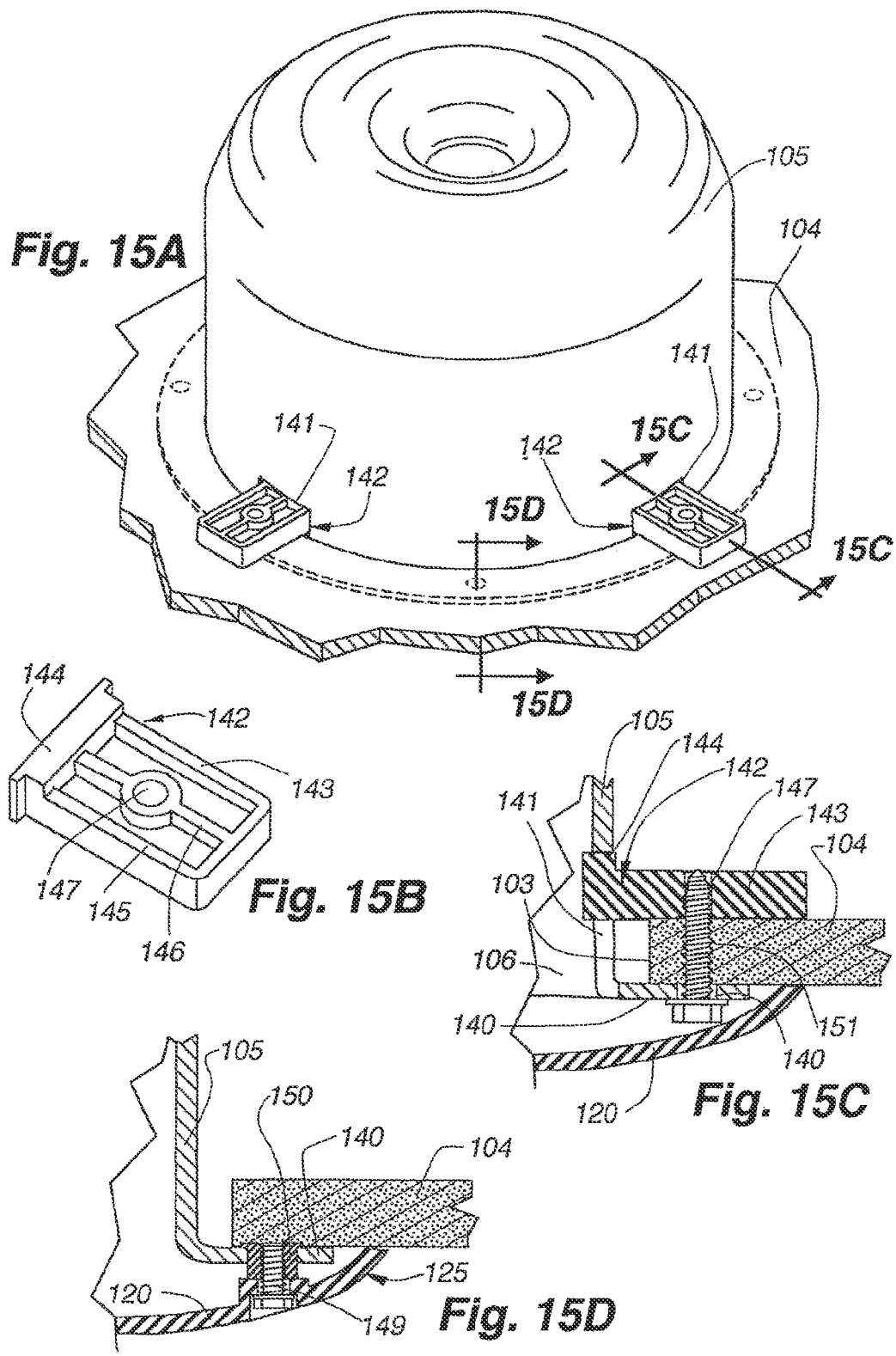

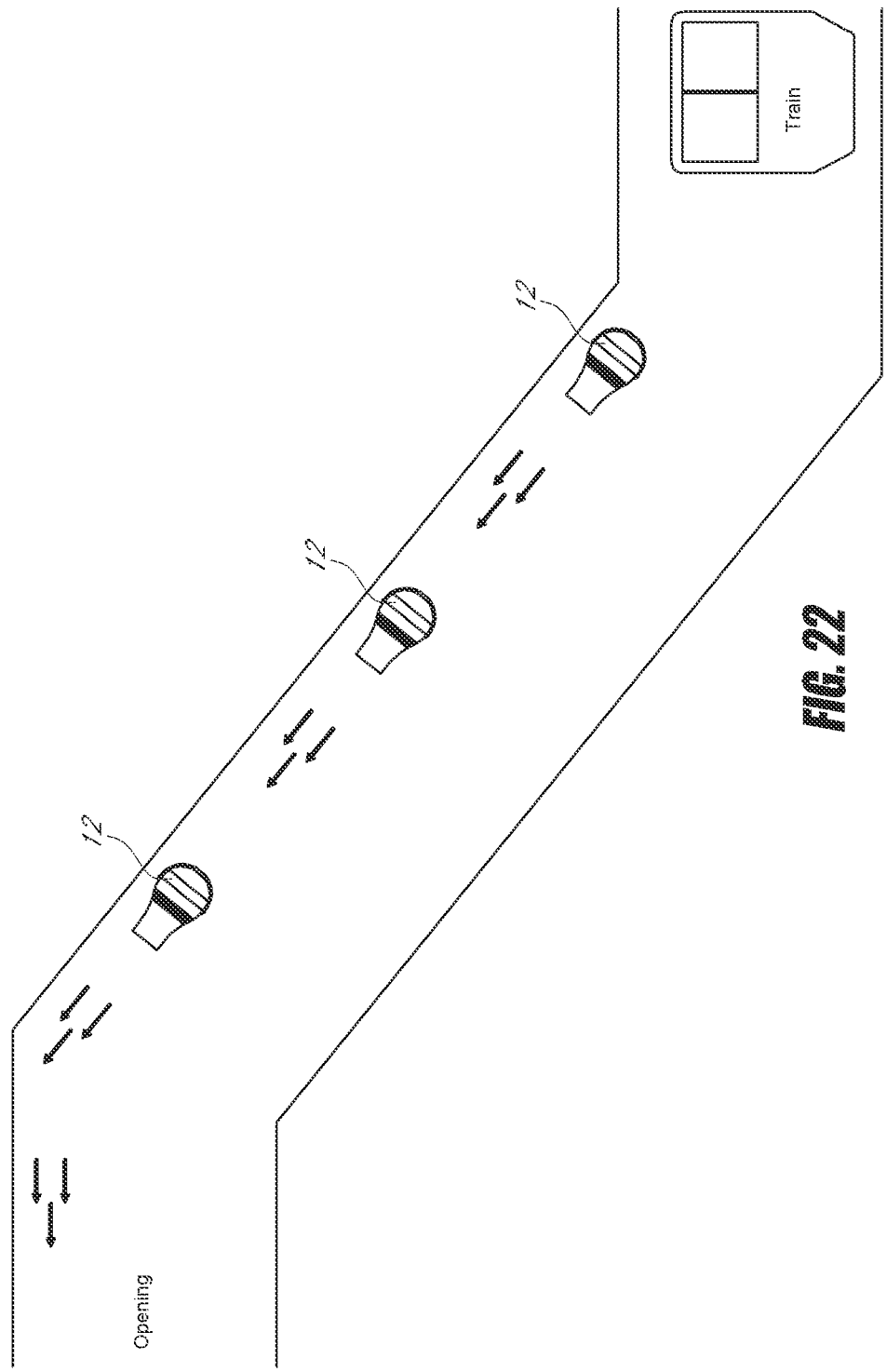

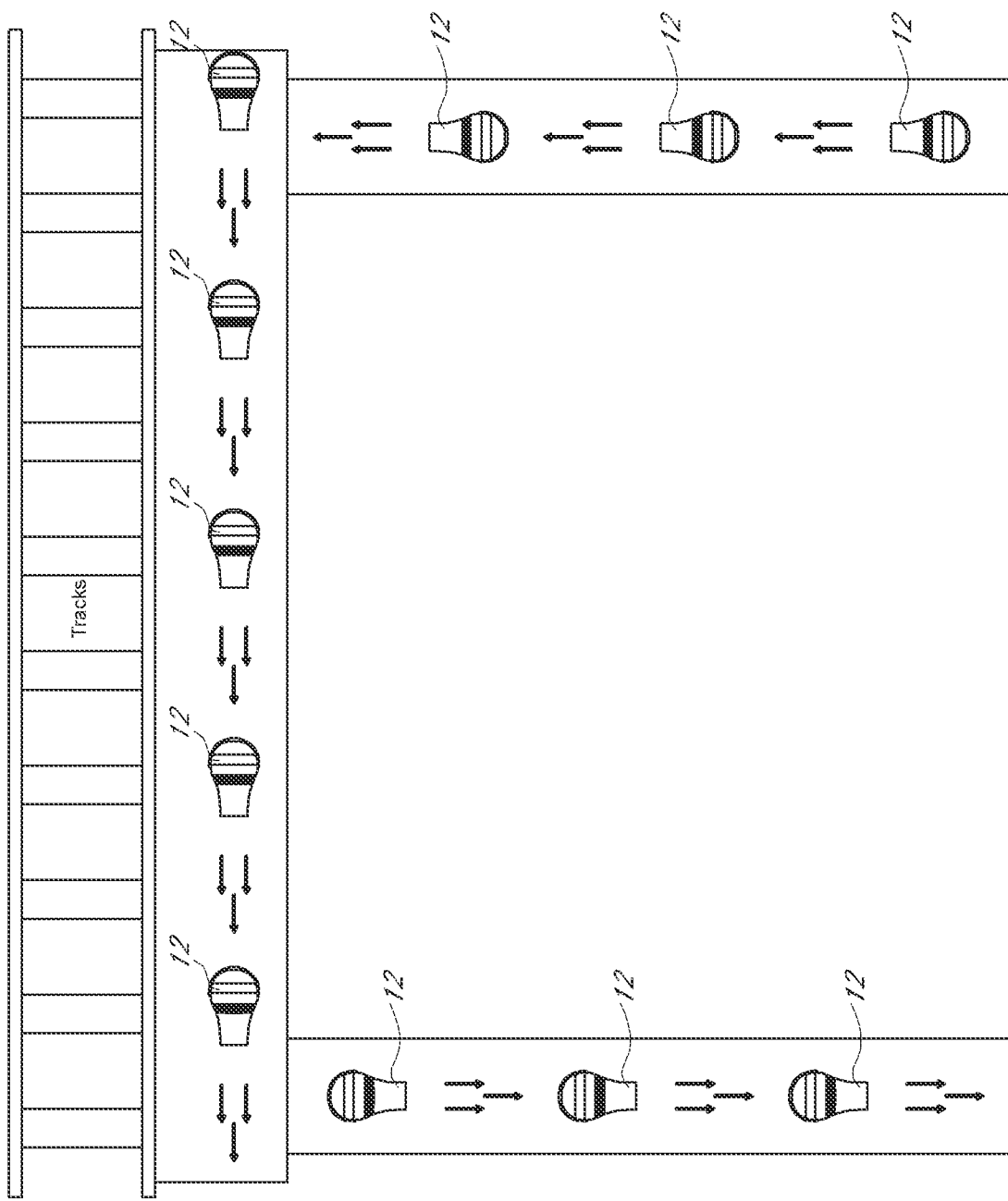

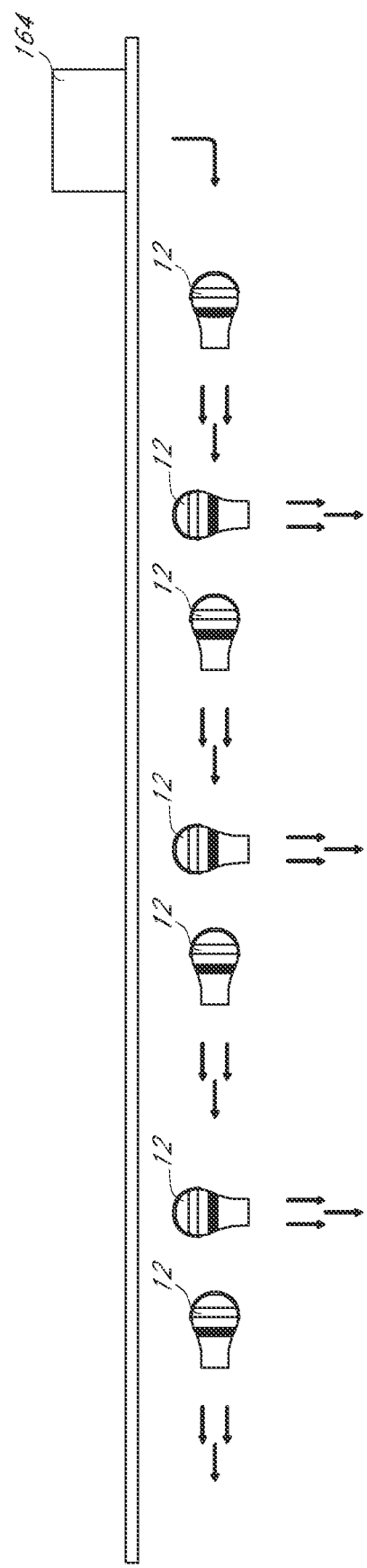

TEMPERATURE DESTRATIFICATION SYSTEMS

CROSS-REFERENCE TO RELATED APPLICATIONS

This application is a continuation of U.S. application Ser. No. 17/303,592, filed Jun. 2, 2021, incorporated in its entirety by reference herein, which is a continuation of U.S. application Ser. No. 16/662,957, filed Oct. 24, 2019, now U.S. Pat. No. 11,053,948, issued Jul. 6, 2021, incorporated in its entirety by reference herein, which is a continuation of U.S. application Ser. No. 15/648,261, filed Jul. 12, 2017, now U.S. Pat. No. 10,487,840, issued Nov. 26, 2019, incorporated in its entirety by reference herein, which is a continuation of U.S. application Ser. No. 15/480,285, filed Apr. 5, 2017, now U.S. Pat. No. 9,714,663, issued Jul. 25, 2017, incorporated in its entirety by reference herein, which is a continuation of U.S. application Ser. No. 15/061,951, filed Mar. 4, 2016, now U.S. Pat. No. 9,631,627, issued Apr. 25, 2017, incorporated in its entirety by reference herein, which is a continuation of U.S. application Ser. No. 13/365,223, filed Feb. 2, 2012, incorporated in its entirety by reference herein, which is a continuation-in-part of U.S. application Ser. No. 12/130,909, filed May 30, 2008, incorporated in its entirety by reference herein, which is a continuation of U.S. application Ser. No. 11/027,039, filed Dec. 30, 2004, now U.S. Pat. No. 7,381,129, issued Jun. 3, 2008, incorporated in its entirety by reference herein, which claims the benefit under 35 U.S.C. § 119(e) to U.S. Provisional Patent Application No. 60/553,720 filed Mar. 15, 2004, which is incorporated in its entirety by reference herein, and said U.S. application Ser. No. 13/365,223 also claims the benefit under 35 U.S.C. § 119(e) to U.S. Provisional Patent Application No. 61/521,270 filed Aug. 8, 2011, which is incorporated in its entirety by reference herein.

BACKGROUND OF THE INVENTION

Field of the Invention

The present invention relates to heating, ventilating and air conditioning air spaces, and more particularly to systems, devices and methods for moving air in a columnar pattern with minimal lateral dispersion that are particularly suitable for penetrating air spaces and air temperature de-stratification.

Description of the Related Art

The rise of warmer air and the sinking of colder air creates significant variation in air temperatures between the ceiling and floor of buildings with conventional heating, ventilation and air conditioning systems. Such air temperature stratification is particularly problematic in large spaces with high ceilings such as warehouses, gymnasiums, offices, auditoriums, hangers, commercial buildings, and even residences with cathedral ceilings, and can significantly decrease heating and air conditioning costs. Further, both low and high ceiling rooms can have stagnant or dead air. For standard ceiling heights with duct outlets in the ceiling there is a sharp rise in ceiling temperatures when the heat comes on.

One proposed solution to air temperature stratification is a ceiling fan. Ceiling fans are relatively large rotary fans, with a plurality of blades, mounted near the ceiling. The blades of a ceiling fan have a flat or airfoil shape. The blades have a lift component that pushes air upwards or downwards, depending on the direction of rotation, and a drag component that pushes the air tangentially. The drag component causes tangential or centrifugal flow so that the air being pushed diverges or spreads out. Conventional ceiling fans are generally ineffective as an air de-stratification device in relatively high ceiling rooms because the air pushed by conventional ceiling fans is not maintained in a columnar pattern from the ceiling to the floor, and often disperses or diffuses well above the floor.

Another proposed solution to air temperature stratification is a fan connected to a vertical tube that extends substantially from the ceiling to the floor. The fan may be mounted near the ceiling, near the floor or in between. This type of device may push cooler air up from the floor to the ceiling or warmer air down from the ceiling to the floor. Such devices, when located away from the walls in an open space in a building, interfere with floorspace use and are not aesthetically pleasing. When confined to locations only along the walls of an open space, such devices may not effectively circulate air near the center of the open space. Examples of fans connected to vertical tubes are disclosed in U.S. Pat. No. 3,827,342 to Hughes, and U.S. Pat. No. 3,973,479 to Whiteley.

A device that provides a column of air that has little or no diffusion from the ceiling the floor, without a vertical tube, can effectively provide air de-stratification. U.S. Pat. Nos. 4,473,000 and 4,662,912 to Perkins disclose a device having a housing, with a rotating impeller having blades in the top of the housing and a plurality of interspersed small and large, vertically extending, radial stationary vanes spaced below the impeller in the housing. The device disclosed by Perkins is intended to direct the air in a more clearly defined pattern and reduce dispersion. Perkins, however, does not disclose the importance of a specific, relatively small gap between the impeller blades and the stationary vanes, and the device illustrated creates a vortex and turbulence due to a large gap and centrifugal air flow bouncing off the inner walls of the housing between the blades and vanes. Perkins also discloses a tapering vane section. The tapering vane section increases velocity of the exiting air stream.

A device with a rotary fan that minimizes the rotary component of the air flow while maximizing the axial air flow quantity and velocity can provide a column of air that flows from a high ceiling to a floor in a columnar pattern with minimal lateral dispersion that does not require a physical transporting tube. Such a device should reduce the energy loss by minimizing the rotary component of the air flow, and therefore minimizes turbulence. Such a device should minimize back pressure, since a pressure drop at the outlet of the device will cause expansion, velocity loss and lateral dispersion. The device should have minimum noise and low electric power requirements.

SUMMARY OF THE INVENTION

A temperature destratification assembly can include an outer housing. The outer housing can have an inlet, an outlet, and an inner wall. The assembly can include an impeller positioned within the outer housing between the inlet and outlet of the outer housing. In some embodiments, the impeller has an impeller hub and a plurality of impeller blades extending radially outward from the impeller hub. The destratification assembly can include an impeller motor configured to rotate the impeller blades about an axis of rotation. In some embodiments, the destratification assembly includes a stator positioned within the outer housing between the impeller and the outlet of the outer housing. The stator can include an upstream end and a downstream end. In some embodiments, the stator includes a plurality of vanes, every vane of the stator having an upstream edge at the upstream end of the stator, a downstream edge, a first surface extending from the upstream edge to the downstream edge of the vane, and a second surface opposite the first surface and extending from the upstream edge to the downstream edge of vane. In some embodiments, the downstream edge of one or more of the plurality of the vanes is at the outlet of the outer housing.

In some embodiments, the impeller hub is hollow.

In some embodiments, one or more of the plurality of the vanes extend further inward toward the axis of rotation than the impeller blades.

In some embodiments, two or more of the plurality of vanes are connected to each other at the downstream end of the plurality of vanes.

In some embodiments, a downstream edge of at least one of the plurality of vanes is positioned between the impeller and the outlet of the housing.

In some embodiments, the outer housing includes an outer surface, and wherein the outer surface of the outer housing is narrower at the outlet than at the inlet.

In some embodiments, an upstream portion of each vane is curved and a downstream portion of each vane is straight and parallel with the axis of rotation.

In some embodiments, the destratification assembly includes a plurality of stator flow passages extending from the upstream end of the stator toward the downstream end of the stator, wherein each of the stator flow passages is free from obstruction from vane leading edges.

According to some variants, a temperature destratification assembly can include a housing having an inlet, an outlet, and an inner surface extending from the inlet to the outlet. The assembly can include an impeller positioned within the housing between the inlet and the outlet. In some embodiments, the impeller includes an impeller hub and a plurality of impeller blades extending from the impeller hub toward the inner surface of the housing. Each impeller blade can have an upstream edge and a downstream edge. In some embodiments, the destratification assembly includes an impeller motor configured to rotate the impeller hub about an axis of rotation. The assembly can include a stator assembly positioned downstream of the impeller. In some embodiments, the stator assembly includes a plurality of vanes extending along a majority of a distance between the impeller and the outlet of the housing. Each of the plurality of vanes can have an upstream vane edge adjacent the downstream edge of an impeller blade, a downstream vane edge opposite the upstream vane edge, a first face extending from the upstream vane edge to the downstream vane edge, and a second face opposite the first face and extending from the upstream vane edge to the downstream vane edge. In some embodiments, each of the first and second faces of the plurality of vanes has an upstream portion and a downstream portion. In some embodiments, the downstream portions of each of the first and second faces are uninterrupted.

In some embodiments, the impeller hub is hollow.

In some embodiments, the plurality of vanes extend further inward toward the axis of rotation than the impeller blades.

In some embodiments, the plurality of vanes are connected to each other at the downstream edge of the plurality of vanes.

In some embodiments, the outer housing includes an outer surface. In some embodiments, the outer surface of the outer housing is narrower at the outlet than at the inlet.

In some embodiments, an upstream portion of each vane is curved and a downstream portion of each vane is straight and parallel with the axis of rotation.

According to some variants, a temperature destratification assembly can include an outer housing having an inlet, an outlet, and an inner wall. The destratification assembly can include an impeller positioned within the outer housing between the inlet and outlet of the outer housing, the impeller having a plurality of impeller blades. In some embodiments, the assembly includes an impeller motor configured to rotate the impeller blades about an axis of rotation. The assembly can include a stator positioned within the outer housing between the impeller and the outlet of the outer housing. In some embodiments, the stator has an upstream end, a downstream end, a stator hub, a plurality of stator vanes connected to the stator hub and extending radially outward therefrom, a plurality of inlets at the upstream end of the stator, and a plurality of outlets at the downstream end of the stator. In some embodiments, the stator includes at least as many inlets as outlets.

In some embodiments, the inner wall is a smooth uninterrupted surface.

In some embodiments, the stator comprises more inlets than outlets.

In some embodiments, the stator hub tapers toward the axis of rotation from an upstream end of the stator hub to a downstream end of the stator hub.

In some embodiments, the outer housing tapers inward toward the axis of rotation between the upstream end of the stator and the downstream end of the stator.

In some embodiments, the stator hub is cylindrical

An air moving device which has a housing with an air inlet and an air outlet spaced from the inlet. A rotary impeller with a plurality of blades is mounted in the housing at the air inlet end and produces air flow with an axial component and a rotary component. A plurality of spaced, longitudinally extending, radial air guide vanes in the housing downstream of the impeller are in close proximity to the impeller blades to minimize the rotary component and change the air flow to a laminar and axial flow in the housing that exits the outlet end in a columnar pattern with minimal lateral dispersion. A method of moving air includes producing an air flow through a housing, and directing the air flow through the housing in a laminar and axial flow and exits an outlet so as to produce a columnar pattern with minimal lateral dispersion. The method also includes directing warm air from near the ceiling toward the floor, allowing the heat from the warm air to be stored in the floor, articles on the floor and the earth under the floor. The method includes directing air in a generally horizontal direction to allow penetration of an air space in a container, trailer truck or a room to promote flushing of that air space and circulation thereof. The device and method are particularly suitable for high efficiency, low power usage, air temperature de-stratification, and to improve air quality and circulation.

BRIEF DESCRIPTION OF THE DRAWINGS

Details of this invention are described in connection with the accompanying drawings that bear similar reference numerals in which:

FIG. 1 is a top perspective view of an air moving device embodying features of the present invention.

FIG. 2 is a side elevation view of the device of FIG. 1.

FIG. 3 is a bottom view of the device of FIG. 1.

FIG. 5 is a sectional view taken along line 5-5 of FIG. 2.

FIG. 6 is a sectional view taken along line 6-6 of FIG. 2.

FIG. 7 is a sectional view taken along line 5-5 of FIG. 2, with straight upstream portions of the vanes.

FIG. 10 is a side view of a room with the device of FIG. 1 showing an air flow pattern with dashed lines and arrows.

FIG. 11 is a side elevation view, partially cut away, showing the device of FIG. 1 modified for attachment to a light can.

FIG. 11A is a sectional view taken along line 11A-11A of FIG. 11.

FIG. 12 is a side elevation view of the device of FIG. 1 with an intake grill.

FIG. 15A is a top perspective view of FIG. 15.

FIG. 15B is a top perspective view of the fastening member shown in FIG. 15A

FIG. 15C is a sectional view taken along FIG. 15C-15C of FIG. 15A.

FIG. 15D is a sectional view along line 15D-15D of FIG. 15A.

FIG. 18 is a schematic view of an open sided tent with an air moving device in the top.

FIGS. 20-24 are schematic representations of a plurality of air moving devices used to create a cascading airflow.

DETAILED DESCRIPTION OF THE PREFERRED EMBODIMENT

Figure 4:
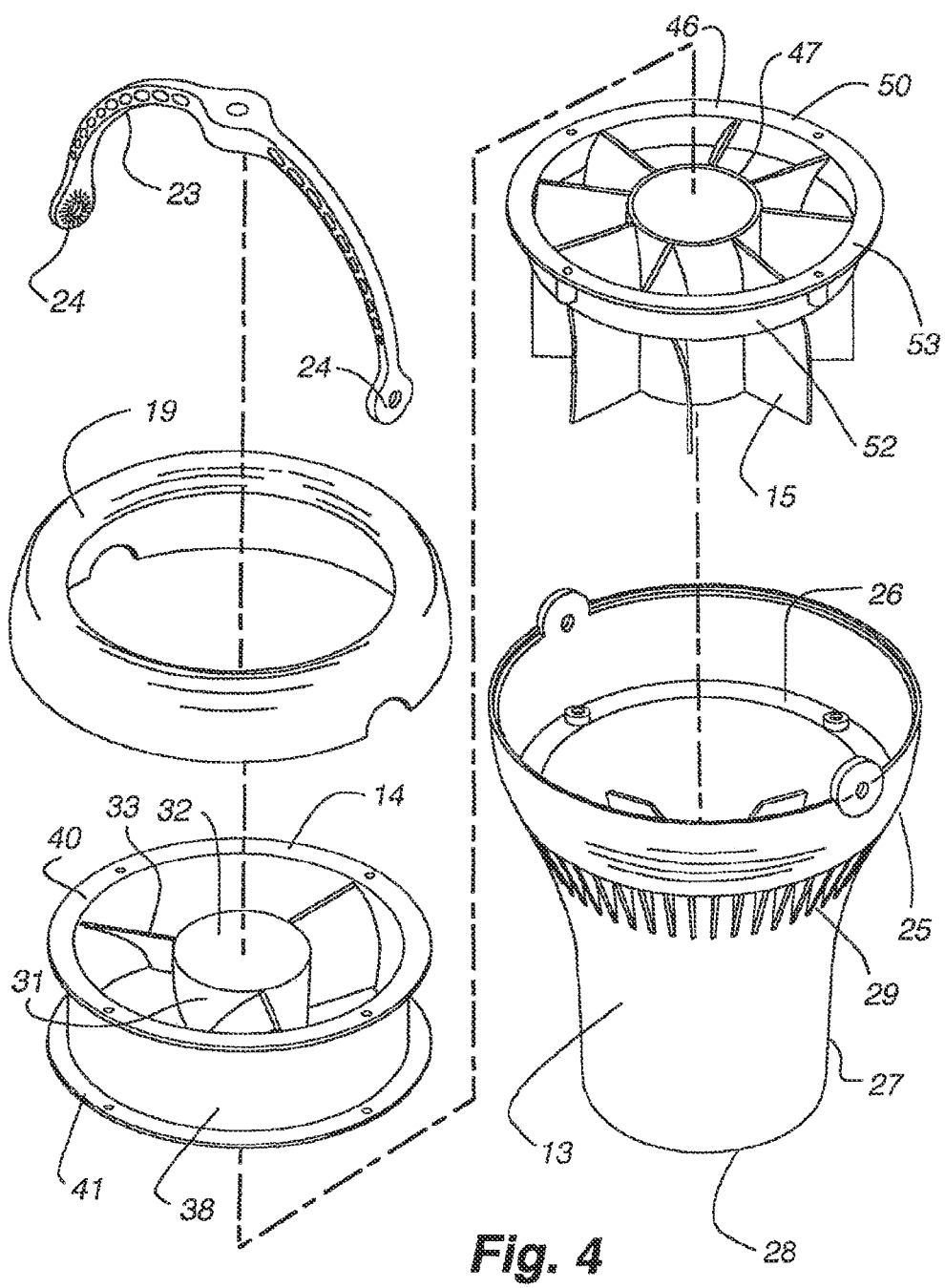
FIG. 4 is an exploded perspective view of the device 5 of FIG. 1.

Referring now to FIGS. 1 to 9, there is shown an air moving device 12 having an elongated outer housing 13, an electric rotary fan 14 in the housing for producing air flow in the housing and a plurality of longitudinally extending, outer radial vanes 15 and an inner housing hub 16 opposite the vanes in the housing downstream of the fan for directing air flow in the housing.

The housing 13 has a circular cross section, and an open first end 17 and an open second end 18 spaced from the first end 17. In the illustrated embodiment, a detachable, axially outwardly convex cowling 19 forms the first end 17 and provides an air inlet 21 with a diameter slightly smaller than the outer diameter of the cowling 19.

The housing 13 has a first section 25 extending from the cowling 19 to an interior shelf 26. A generally C shaped hanger 23 mounts at opposite ends 24 to opposite sides of the housing 13 at the upper end of the first section 25, for mounting the air moving device 12 to a support. The first section 25, when viewed from the side, has a curved, slightly radially outwardly convex shape that conforms to the curvature of the cowling 19. The shelf 26 extends radially inwardly to join with the upstream end of a second section 27. The second section 27 tapers inwardly and extends axially from the shelf 26 to the second end 18 along a smooth curve that goes from radially outwardly convex near the shelf 26 to radially outwardly concave near the second end 18. The second end 18 forms an air outlet 28 that has a smaller diameter than the air inlet 21. A plurality of circumferentially spaced external fins 29 extend from the shelf 26 to the second section 27 to provide the appearance of a smooth curve from the air inlet 21 to the air outlet 28 when the housing 13 is viewed from the side.

The fan 14 includes an impeller 31 having a cylindrical, inner impeller hub 32, with an electric motor 34 therein, and a plurality of rigidly mounted, circumferentially spaced blades 33 extending radially from the impeller hub 32. In the illustrated embodiment the impeller 31 has three equally spaced blades 33 and rotates about an axis in a counterclockwise direction when viewed from above. Each blade 33, in side view, extends from an upstream edge 35, downwardly and leftwardly to a downstream edge 36 with each blade 33 being slightly concave, in an airfoil or wing shape, downwardly to propel air rightwardly as shown by the arrow. Each blade 33 then inclines at a selected angle to the axis of rotation of the impeller. Each blade 33 shown extends axially and radially toward the outlet or second end 18 to direct air axially with a rotary component. If the motor 34 runs in the opposite direction, the incline of the blades 33 would be reversed. The fan 14 includes a stationary cylindrical mounting ring 38 that extends around the blades 33, with the impeller hub 32 being rotably mounted relative to the mounting ring 38. The mounting ring 38 has spaced, protruding upstream and downstream rims 40 and 41. The fan 14 mounts in the housing 13 between the cowling 19 and the shelf 26.

Each of the vanes 15 is identical and includes upstream portion 43 and a downstream portion 44. The upstream portion 43 is carried in a stator 46. The stator 46 has a cylindrical stator hub 47 with a diameter substantially equal to the diameter of the impeller hub 32.

The upstream portions 43 of the vanes 15 are mounted in a circumferentially spaced arrangement around the stator hub 47, and extend longitudinally along and radially from the stator hub 47. Each upstream portion 43 has an upstream end 48 and a downstream end 49. A support body 50 includes a cylindrical stator ring 52 that extends around the upstream portions 43 and connects to the outer ends of the upstream portions 43 of the vanes 15 near the upstream ends 48. The support body 50 also includes a protruding stator rim 53 that is substantially planar with the upstream ends 48 of the upstream portions 43 of the vanes 15, and that connects to the stator ring 52 and extends radially outwardly therefrom.

The housing 13 has, an inner surface and the inner housing hub 16 has an outer surface concentric with a spaced from the housing inner surface to define an air flow passage through the housing. The inner housing hub 16 includes the fan hub 32, stator hub portion 47 and downstream hub portion 57, each having an outer surface and arranged end to end along the center of the housing and opposite and spaced from the housing inner surface to define the air flow passage. In particular, these outer surfaces shown are cylindrical and substantially the same diameter for a substantial portion of the passage and as the housing 13 converges the downstream hub portion 57 converges to generally follow the curvature of the inside surface of the housing.

The stator 46 nests in and is separable from the housing 13 with the stator rim 53 between the shelf 26 of the housing 13 and the downstream rim 41 of the mounting ring 38 of the fan 14, and with a gap 55 having a selected size between the downstream edge 36 of the blades 33 of the impeller 31 and the upstream ends 49 of the upstream portions 43 of the vanes 15. If the gap 55 is too large, turbulence will be generated in the air flow between the impeller 31 and the vanes 15, reducing the velocity of the air flow. If the gap 55 is too small, fluid shear stress will generate noise. The size of the gap 55 is generally selected as no greater than a maximum selected dimension to avoid turbulence and no less than a selected minimum dimension to avoid noise, and more particularly selected as small as possible without generating noise.

The selected size of the gap 55 is generally proportional to the diameter of the impeller 31 and may further be affected by the speed of the impeller 31. The following are examples: For an impeller 31 with a diameter of 6.00", at 1800 rpm, the maximum size of the gap 55 should be 1.25" and the minimum gap should be 0.2". For an impeller 31 with a diameter of 8.5", at 1400 rpm, the maximum size of the gap 55 should be 1.25", and the minimum gap should be 0.2" but could be 0.020 for lower rpm's as the size of the gap is rpm dependent. Generally, the maximum size of the gap 55 should be less than one half the diameter of the impeller 31.

In the illustrated embodiment, eight equally spaced upstream portions 43 of the vanes 15 are provided, and when viewed from the side, the upstream portions 43 of the vanes 15 extend straight upwardly from the downstream ends 49 and then curve leftwardly near the upstream ends 48. The upstream portion 43 of each curved vane portion is inclined at an angle opposite the incline of the blade 33 that extends axially and radially inward toward the outlet or second end 28 to assist in converting the rotary component of the air flow into laminar and axial flow in the housing.

Straight upstream portions 43A of the vanes 15 may also be used, as shown in FIG. 7, and other numbers of vanes 15 may be used. Further, if the motor 34 runs in the opposite direction, the incline of the curvature near the upstream ends 48 would be reversed.

The downstream portions 44 of the vanes 15 attach at an inner end to a downstream inner housing hub portion 57, are circumferentially spaced and extend radially outwardly from the housing hub portion 57 to the housing 13. The housing hub portion 57 and the downstream portions 44 of the vanes 15 extend axially from the stator 46 to or near the air outlet 28. The housing hub portion 57 has a circular cross section, has a diameter substantially equal to the diameter of the stator housing hub portion 47 at the upstream end adjacent to the stator housing hub portion 47, and tapers downstream to a point 58 near the air outlet 28.

This hub portion may be characterized as torpedo shaped. In the illustrated embodiment there are four downstream portions 44 of the vanes 15 circumferentially spaced at 90 degrees, with each downstream portion 44 being aligned with an upstream portion 43 of a vane 15. Other numbers of downstream portions 44 of the vanes 15 can be used.

The number of the blades 33 may be 2, 3, 4, 5, 6, 7 or 8. The number of the vanes 15 may be 2, 3, 4, 5, 6, 7 or 8. The number of vanes 15 should be different from the number of blades 33. If the number of vanes 15 and blades 33 are the same, added noise is generated due to harmonics.

The air moving device 12 discharges air at a high velocity in a generally axial flow having a columnar pattern with minimal lateral dispersion after exiting the air outlet 28. The cowling 19 extends along a curve toward the inside to reduce turbulence and noise for air flow entering the air inlet 21. The impeller hub 32, the stator hub 47 and the housing hub 57 form the inner housing hub 16. The taper of the housing hub 57 generally follows the taper of the housing 13 So that the cross sectional area for air flow decreases about 10% to 35% through the air moving device 12 to avoid back pressure and at the same time increase air flow velocity. In the embodiment shown the air flow decreases about 22%.

The vanes 15 convert the rotary component of the air flow from the impeller 31 into laminar and axial air flow in the housing. The leftward curve of the upstream ends 48 of the upstream portions 43 of the vanes 15, in the illustrated embodiment, reduces the energy loss in the conversion of the rotary component of the air flow from the impeller 31 into laminar and axial air flow in the housing. The small gap 55 between the impeller 31 and vanes 15 prevents the generation of turbulence in the air flow in the gap 55. The taper of the housing 13 in combination with the taper of the housing hub 57 to the point 58 allows the air flow to exit the air outlet 28 in a continuous, uninterrupted columnar pattern with minimal dispersion, with no center hole or gap at a linear speed greater than would be imparted by a fan alone. The inside surface of the housing 13 is a substantially smooth uninterrupted surface to minimize turbulence and energy loss.

Figure 8:
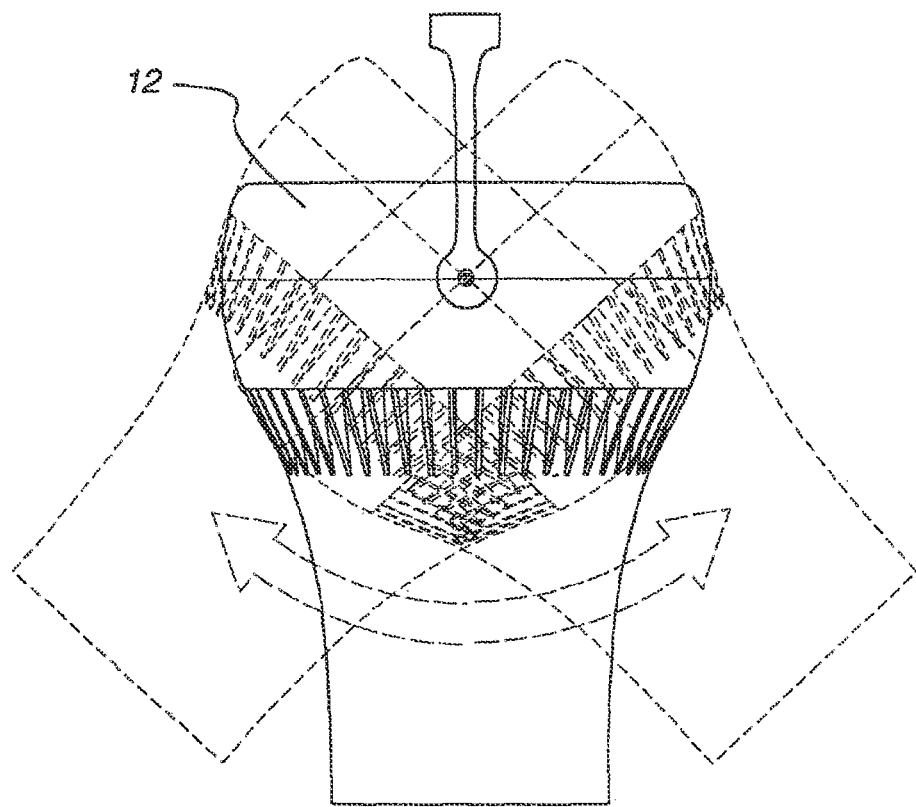
FIG. 8 is a side elevation view of the device of FIG. 1 showing angular direction of the device.
Figure 9:
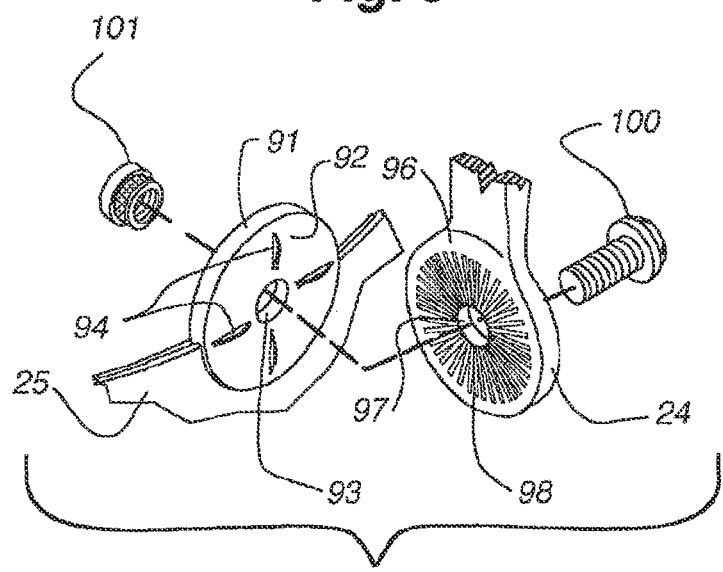
FIG. 9 is an enlarged, partial exploded view of the hangar attachment of the device of FIG. 1.

The hanger 23 is mounted to rotate and lock relative to the housing 13, so that when the hanger 23 is attached to an overhead support such as ceiling, the air flow from the air moving device 12 may be directed vertically or aimed at any selected angle from the vertical as shown in FIG. 8. As shown in FIGS. 1 and 9, the first section 25 of the housing 13 includes mounting tabs 91 on opposite sides on the upper edge of the first section 25. Each mounting tab 91 includes a round, outwardly directed mounting face 92, and a housing aperture 93 that extends inwardly through the center of the mounting tab 91. A pair of outwardly projecting housing ridges 94 extend radially on the mounting face 92 on opposite sides of the housing aperture 93.

Each end 24 of the hanger 23 has a round, inwardly facing hanger end face 96, similar in size to the mounting face 92 on the housing 13. A hanger end aperture 97 extends through the center of the hanger end face 96. A plurality of spaced, radially extending grooves 98, sized to receive the housing ridges 94, are provided on each hanger end face 96. Bolt 100 extends through the hanger end aperture 97 and threads into an internally threaded cylindrical insert 101, rigidly affixed in housing aperture 93. The angle of the housing 13 is chosen by selecting a pair of opposed grooves 97 on each hanger end 24 to receive the housing ridges 94. The pivotal arrangement enables the housing to move to a selected angle and is lockable at the selected angle to direct air flow at the selected angle.

FIG. 10 shows an air moving device 12 mounted to the 13 ceiling 62 of a room 63 shown as being closed sided with opposed side walls. Warm air near the ceiling 62 is pulled into the air moving device 12. The warm air exits the air moving device 12 in a column 64 that extends to the floor 65. When the column 64 reaches the floor 65, the warm air from the ceiling pushes the colder air at the floor 65 outward towards the opposed side walls 66 and upward towards the ceiling 62. When the column 64 reaches the floor 65, the warm air from the ceiling will also transfer heat into the floor 65, so that heat is stored in the floor 65. The stored heat is released when the ceiling is cooler than the floor. The heat may also be stored in articles on the floor and earth under the floor. The air moving device 12 destratifies the air in a room 63 without requiring the imperforate physical tube of many prior known devices. The air moving device 12 destratifies the air in a room 63 with the warmer air from the ceiling 62 minimally dispersing before reaching the floor 65, unlike many other prior known devices. The air moving device 12 will also remove dead air anywhere in the room. It is understood that the air moving device 12 may also be mounted horizontally in a container, trailer truck or room as is describe hereafter.

Referring to FIG. 11, an air moving device 12 is fitted with an inlet grill 68 and an electric connector 69 for attachment to a light can 70 with a light bulb socket 71 at the upper end. The inlet grill 68 includes a plurality of circumferentially spaced grill fins 72 that attach to the first end 17 of the housing 13. The grill fins 72 are separated by air intake slots 73, and extend axially outwardly from the first end 17 and curve radially inwardly and are integral with a flat circular mounting plate 74 that is substantially parallel with the first end 17. The electrical connector 69 has a tube 76 that is integral at one end with the center of the mounting plate 74 and extends axially therefrom, and a light bulb type, right hand thread externally threaded male end 77 attached to the other end of the shaft 78. Grill 68, plate 74 and tube 76 are shown as made of a one piece construction. Plate 74 has holes that received screws 83 or like fasteners to fasten plate 74 to ceiling 62.

The shaft 78 telescopes in the tube 76. The tube 76 has a pair of opposed keyways 76A that receive keys 78A on the shaft 78 which allow axial sliding movement of the shaft 78 in the tube 76. A compression spring 75 fits in the tube and bears against the bottom of shaft 78 and top of plate 74. Preferably the shaft 78 has a selected length relative to the length of the can 70 such that when the air moving device 12 is mounted in a can 70 in a ceiling 62, the threaded male end 77 engages the socket 71 before the mounting plate 74 contacts the ceiling 62 and when the threaded male end 77 is screwed into the socket 71, the mounting plate 74 bears against the ceiling 62. The spring 75 is compressed between plate 74 and shaft 78. Screws 83 fasten the plate to the ceiling 62. Since the light can 70 may be open to air above the ceiling 62, the mounting plate 74 is preferably sized to cover the open lower end of the can 70, so that only air from below the ceiling 62 is drawn into the air moving device 12. The air moving device 12 fitted with the inlet grill 68 and the electrical connector 69 can also be used with a ceiling light socket.

The air moving device 12 may include an intake grill 79 for preventing objects from entering the impeller 31, as shown in FIG. 12. The intake grill 79 shown has a substantially hemispherical shape, and includes a plurality of circumferentially spaced grill fins 80 separated by intake slots 81. The grill fins 80 extend axially outwardly and curve radially inwardly from the first end 17 of the housing 13 to a central point 82 spaced from the first end 17. Other shapes of intake grills are suitable for the present invention.

Figure 13:
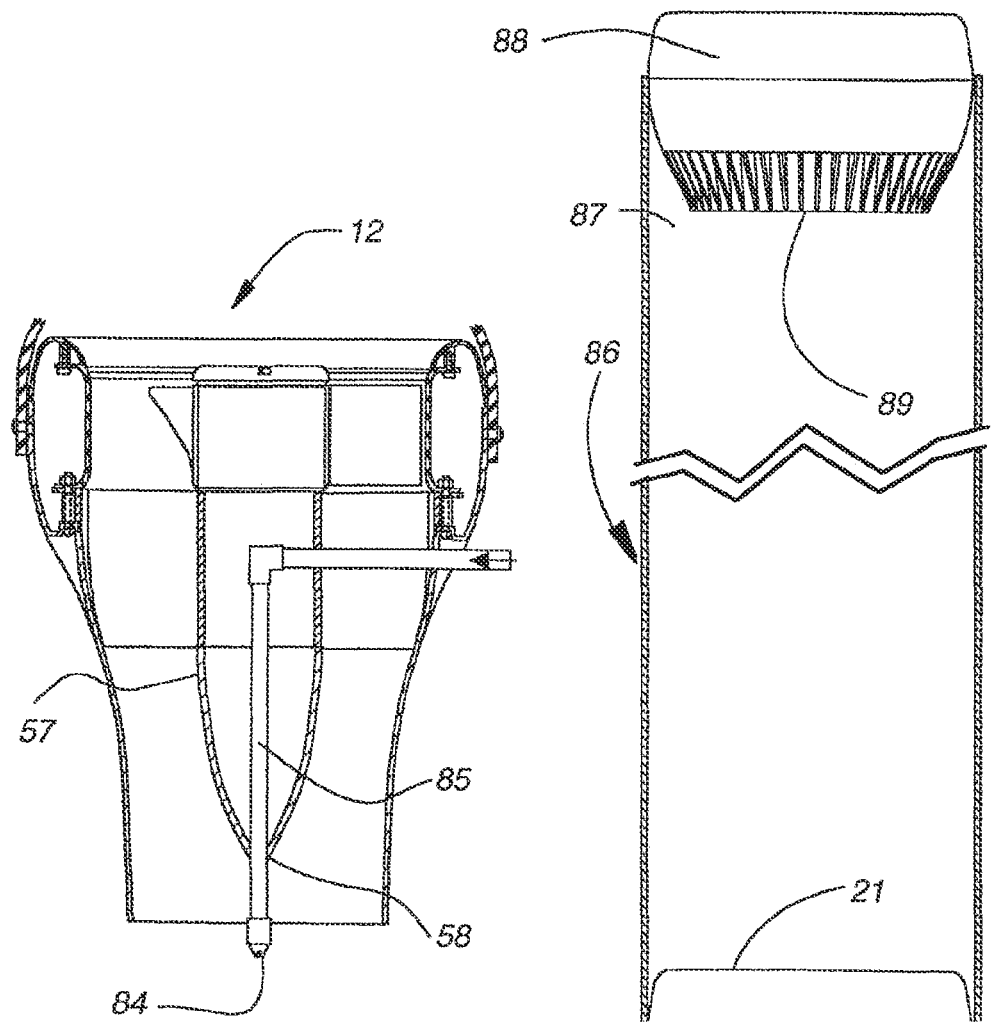
FIG. 13 is a sectional view taken along line 6-6 of FIG. 2 of the device of FIG. 1 with a misting nozzle.

FIG. 13 shows an air moving device 12 with a misting nozzle 84. The nozzle 84 extends through the point 58 of the housing hub 57 to spray water into the column of air exiting the air outlet 28 to cool the air through evaporation. The media exiting the nozzle 84 and being supplied through tube 85 can have other purposes such as a disinfectant or a fragrance or a blocking agent for distinctive needs. The nozzle 84 connects to a water line 85, in the housing hub 59 that connects to a water source (not shown).

Figure 14:
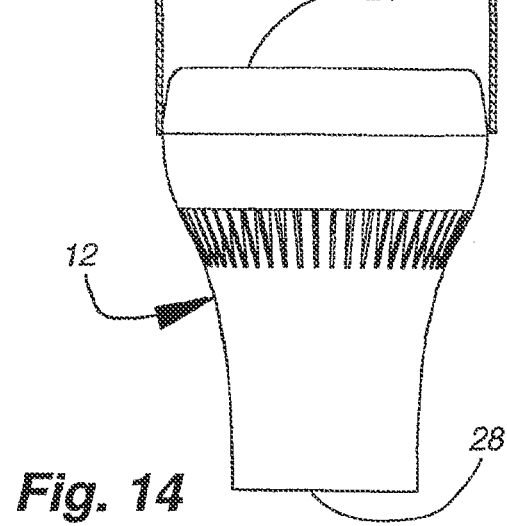
FIG. 14 is a side elevation view of the device of FIG. 1 in combination with a tube and second air moving device.

FIG. 14 shows an air moving system 86 for use in buildings with very high ceilings, including an air moving device 12, an upwardly extending, tube 87 (shown cut away) connected at a lower end to the air inlet 21 of the air moving device 12, and a truncated upper air moving device 88 having an air outlet 89 connected to the upper end of the tube 87. The housing of device 88 is called truncated because it may be shortened or cut off below the fins 29. A conventional air moving device 12 may be used for device 88. The tube 87 may be flexible and is preferably fire resistant. The air moving system 86 is mounted to a ceiling or like support with the air outlet 28 of the air moving device 12 spaced above the floor, preferably about 10 to 50 feet. The tube may be for example from 30 to 100 feet long.

The upper air moving device 88 at the top of the system 86 has a higher air moving flow capacity than the air moving device 12 at the bottom of the cascading system 86. By way of example, and not as a limitation, the upper air moving device 88 may have a capacity of 800 cfm and the air moving device 12 may have a capacity of 550 cfm.

FIGS. 15, 15A, 15B, 15C, 15D and 16 show the air moving device 12 mounted in an opening 103 in a ceiling 104. A generally cylindrical can 105 mounts on and extends above the ceiling 104, and has an open can bottom 106, and a closed can top 107. The can top 107 includes a semi-circular, downward opening, circumferentially extending channel 108. A semi-circular fin 111 extends radially across the channel 108 to prevent swirling of the air before entering the air inlet 21. Additional fins may be used. A grill and support assembly 125 mounts to the ceiling and extends and connects to the exterior of the housing of device 12. A grill including spaced openings 110 between fins 109 to allow air to flow up from the room along the housing and past the cowling 19 into the inlet 21. The grill and support assembly 125 includes an outer ring 120 fastened to the underside of the ceiling including the convexly curved grill fins 109 with air openings 110 between connected outer ring 120 and an inner ring 121. Ring 121 has a spherical concave inner bearing surface 122.

A ring 123 has a spherical convexly curved exterior bearing surface 124 is mounted on and affixed to the housing with bearing surfaces 122 and 124 mating in a frictional fit to support the housing to be at a vertical position or tilted at an angle to the vertical axis and be held by friction at the vertical axis or a selected angle relative to the vertical axis to direct air flow as required.

The can 105 has an outwardly extending bottom flange 140 that fits against the underside of the ceiling 104. The can 105 preferably has four circumferentially spaced bottom openings 141 at 90 degree intervals that are rectangular in shape and extend up the can wall a short distance from the bottom flange 140. A clamping member 142 preferably made as a molded plastic body has a main body portion 143 above the ceiling 104 outside the can wall and an end flange portion 144 that fits inside the can opening 142. The main body portion 143 has a U-shaped outer wall portion 145 and an inner hub portion 146 having an aperture 147. The clamping member 142 inserts into the opening 141 via the open end of the can. A bolt fastener 151 extends through a hole in the flange, through a hole in the ceiling and threads into the aperture 147 in the main body portion to clamp the can 105 to the ceiling 104.

Figure 15:
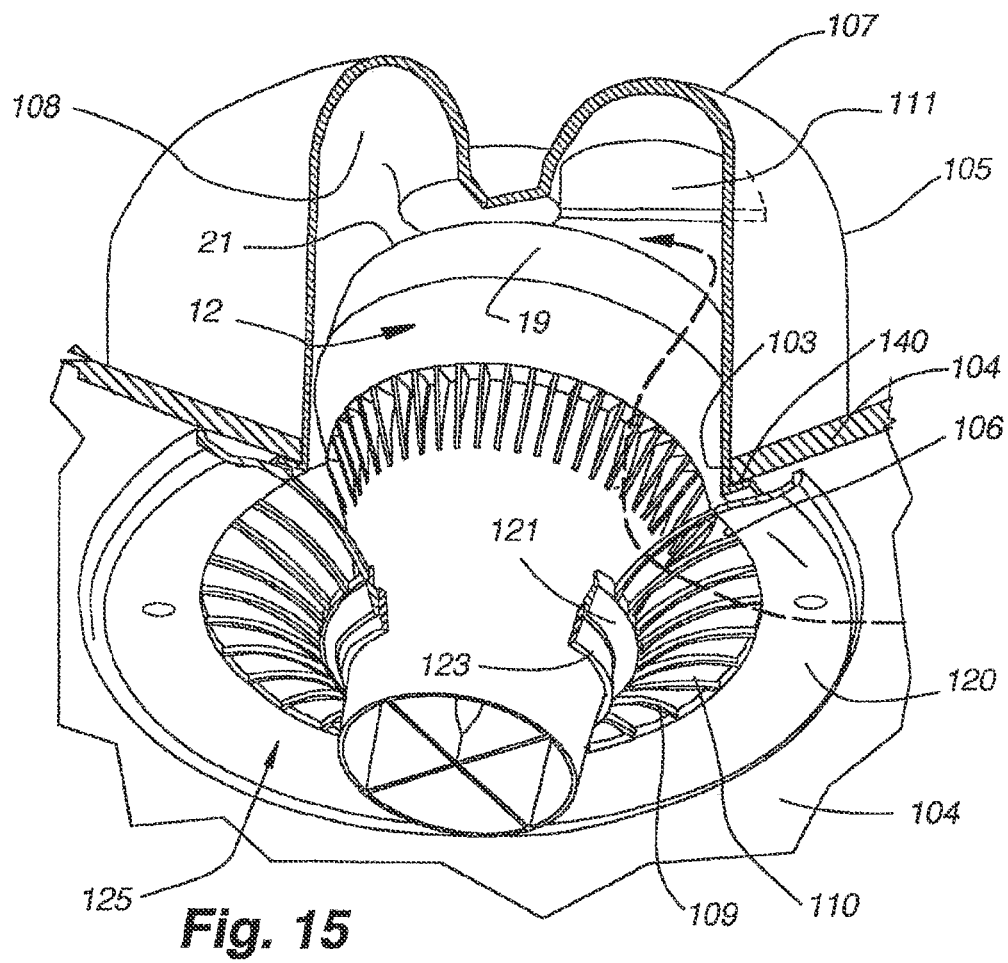
FIG. 15 is a bottom perspective view, partially cut away, showing the device of FIG. 1 mounted in a drop ceiling.
Figure 16:
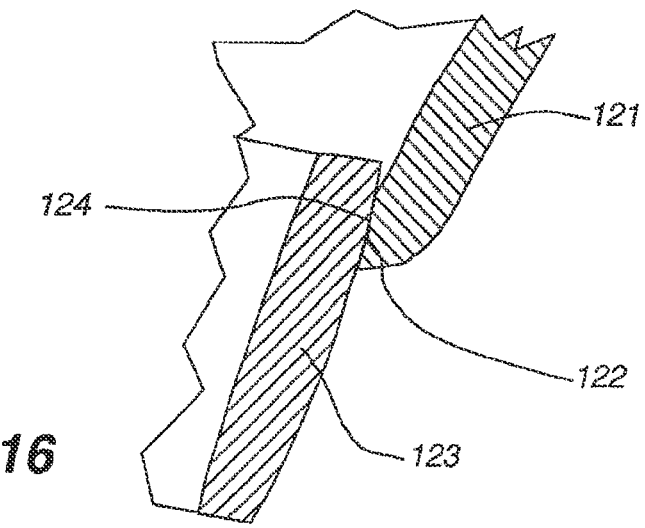
FIG. 16 is an enlarged view of a portion of FIG. 15.

As shown in FIG. 15D the grill and support assembly 125 is mounted to the ceiling 104 and can 105 by a bolt fastener 149 extending through an aperture in ring 120, through the ceiling 104 and into a nut 150 in flange 140 in the can. Preferably there are four bolt fasteners 149 at 90 degree intervals midway between fasteners 151 above described. The ceiling 104 typically would be a plasterboard ceiling in which a suitable hole is cut. A variation of FIG. 15 would be to extend or form the peripheral of outer ring 120 into a flat panel having a dimension of 2 ft. by 2 ft. that would fit in and be held by a grid that holds a conventional ceiling panel.

Figure 17:
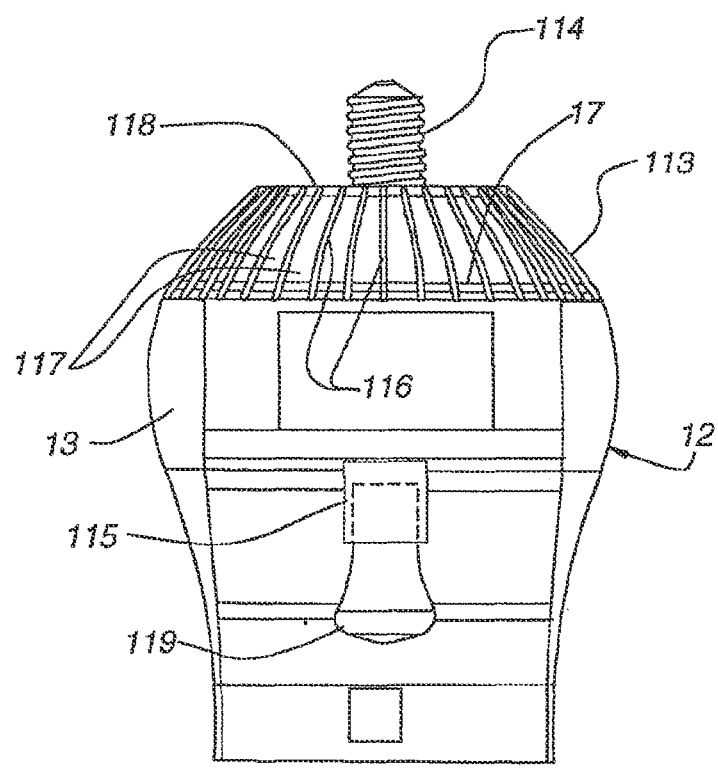
FIG. 17 is a side elevation view, partially cut away, showing the device of FIG. 1 modified for attachment to a light socket and having a light bulb at the lower end.

Referring to FIG. 17, an air moving device is fitted with an inlet grill 113, a light bulb style threaded male end 114 for threading into a light bulb socket, and a light bulb socket 115. The inlet grill 113 includes a plurality of circumferentially spaced grill fins 116 that attach to the first end of the housing 13. The grill fins 116 are separated by air intake slots 117, and extend axially outwardly from the first end 17 and curve radially inwardly to a flat circular mounting plate 118 that is substantially parallel with and spaced axially from the first end 17. Threaded male end 114 is mounted on and extends upwardly from the mounting plate 118. The socket 115 is mounted inside the housing 13 in a downwardly opening fashion so that light from a bulb 119 threaded into the socket 115 is directed downwards.

Referring now to FIG. 18, there is shown a tent having an inclined top 132 extending down from an apex and connected at the lower end to a vertical side wall 131 and terminating above a floor 133 to provide a side opening 134 so that the tent is an open sided room. The air moving device 12 is mounted below the top apex and directs the air in the room downwardly in a columnar pattern to the floor and along the floor and then back with some air passing in and out the side openings 134 along the floor 133. For wide tents, the air will pass up before it reaches the side walls.

The air moving device and system herein described has relatively low electrical power requirement. A typical fan motor is 35 watts at 1600 rpm for an impeller of 8.5" that will effectively move the air from the ceiling to the floor in a room having a ceiling height of 30 ft. Another example is 75 watts with an impeller diameter 8.5" at 2300 rpm in a room having a ceiling height of 70 ft.

Figure 19:
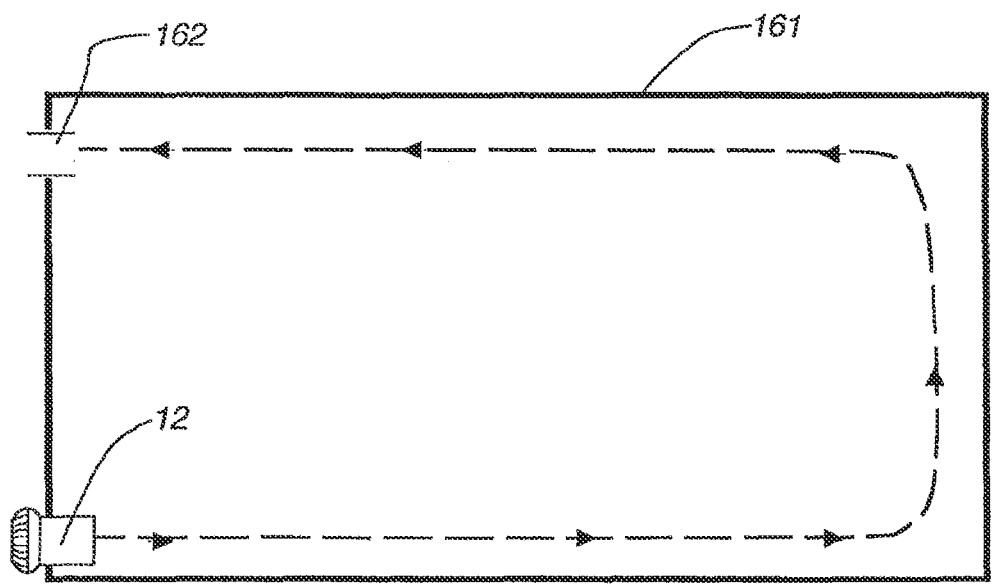
FIG. 19 is a schematic view of a shipping container with an air moving device at one lower end.
Figure 20:
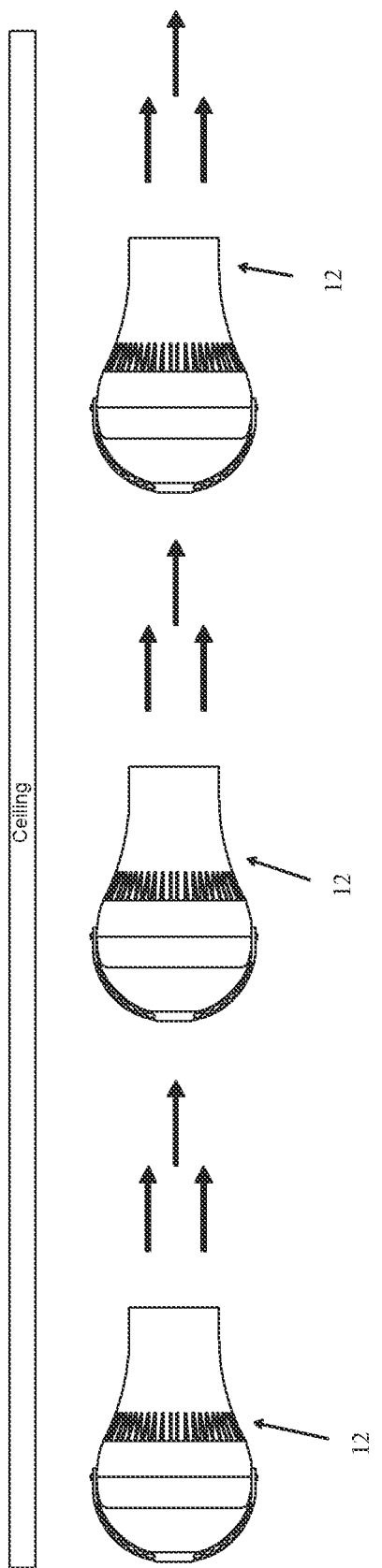

Referring now to FIG. 19, there is shown a shipping container 161 having an air moving device 12 disposed horizontally in the lower left end. The device 12 directs the air horizontally along the bottom wall or floor, up the opposite side wall and across the top wall to exit an outlet duct 162 above and spaced from the device 12 of the air moving device. The device 12 will penetrate the air and promote flushing and circulation of the air space. The device 12 may be mounted to direct the air generally horizontally or up or down at an angle to the true horizontal. This arrangement may be provided in other air spaces such as a trailer truck, room or the like.

It is understood that the stator 46 and housing 13 could be made as a single unit. It is also understood that the housing 13 may be made in two sections as for example a tubular section of a selected length may be added to the end of a truncated devices as shown in FIG. 14.

Further to the discussion above, and referring to FIGS. 20-25, in some embodiments a plurality of the air moving devices 12 described above can be used to create a cascading flow of air from one location to a second location. For example, with reference to FIG. 20, in some embodiments a plurality of air moving devices 12 can be positioned at or near the ceiling of a room or roof of a building. Alternatively or in addition, the air moving devices can be positioned within 4 feet of the floor, within 8 feet of a floor, within 12 feet of a floor or greater than 12 feet from the floor. The air moving devices 12 can be distanced apart from one another. The distances between the air moving devices 12 can vary. In some embodiments the distances can be equal between each air moving device 12. In some embodiments the distance between a first and second air moving device 12 can be different than the distance between the second and a third air moving device 12. In some embodiments the distance between two air moving devices 12 can be approximately 5 feet, 10 feet, 15 feet, 20 feet, 25 feet, 30 feet, 35 feet, or any other desired distance.

The air moving devices 12 can be angled and/or positioned such that the air flow exiting a first air moving device 12 is directed generally towards a second air moving device 12 and/or the air flow exiting the second air moving device 12. In some embodiments the air flow exiting the first air moving device 12 and the air flow exiting the second air moving device 12 are directed generally in the same direction, such that when the air flow exiting the first air moving device 12 reaches the air flow exiting the second air moving device 12, the two air flows generally merge together.

Often times the air flow exiting an air moving device 12 will have a higher velocity nearest the air moving device 12 from which it left, as compared with the velocity of the air flow as it moves farther away from the air moving device 12. The farther away the air flow is from the air moving device 12, the more the air flow will slow down. Thus, with reference to FIG. 20, the air moving devices 12 can be arranged such that as the air flow of a first air moving device 12 is at least 80% of its initial velocity, at least 60% of its initial velocity, at least 40% of its initial velocity, at least 20% of its initial velocity, or at least 10% of its initial velocity before the airflow of the first air moving device 12 encounters and/or is accelerated into the higher velocity air flow created by a second air moving device 12. Desirably, the second air moving device accelerates the air to at least 120%, at least 140%, 160%, 200%, 300%, 400%, 500% of the velocity of the air flow when the air flow from the first air moving device encounters and/or is accelerated into the higher velocity air flow created by a second air moving device 12. In this manner, the second air moving device 12 acts to cascade the air from the first air moving device 12, and to continue to push it along with the air flow from the second air moving device 12. In some embodiments, at least a portion of the air flow from the first air moving device 12 also enters the second air moving device 12, and is directed back out the second air moving device 12 at a higher velocity. Thus, both the second air moving device 12, as well as its exiting air flow, can be used to propel the air flow from the first air moving device 12. With a plurality of air moving devices 12 working in concert, a cascading effect can be achieved, in which the air moving devices 12 work together to move air. This cascading effect can advantageously be used to create a continuous movement of air throughout long stretches of space. This continuous movement of air can help to ventilate, clean, cool, and/or prevent stale air pockets from building up over time.

While the air moving devices 12 can be used within buildings, they can also be used outdoors. For example, people are often required to stand in long lines at amusement parks or other locations. The long lines can extend partially within a building, and/or outside a building. Heat can build up over time, making people uncomfortable as they wait, as can pockets of stale air. Thus, a plurality of air moving devices 12 can be arranged and/or mounted outdoors as well, to help cool and/or remove pockets of stale air.

Figure 21:
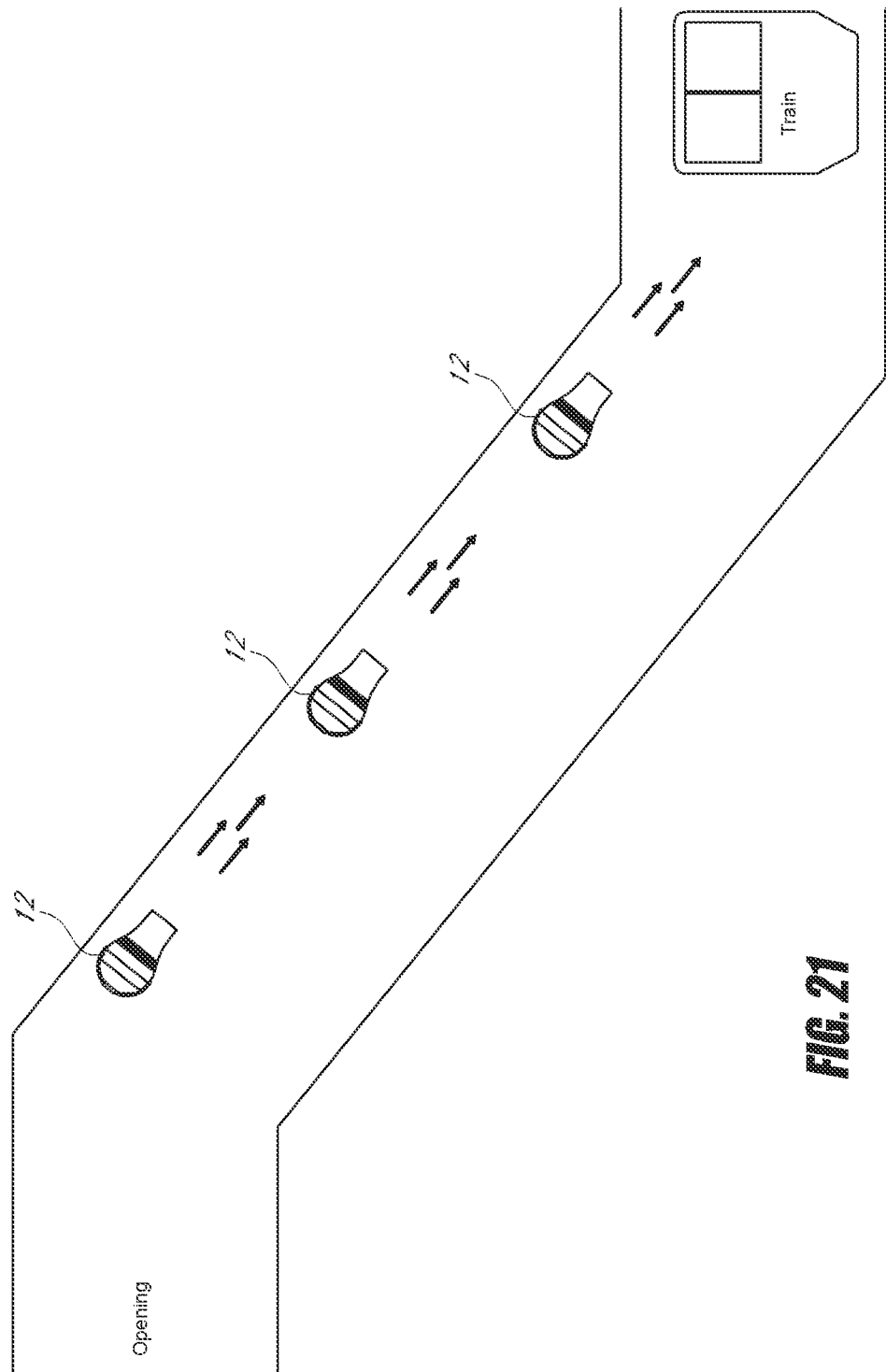

With reference to FIGS. 21-23, in some embodiments a plurality of air moving devices 12 can be arranged, for example, to move cool air from a first location into a second location. For example, cool air can be moved from a street level location to a subway or train station terminal. As illustrated in FIGS. 21-23, the air moving devices 12 can be spaced apart and angled such that a continuous airflow is created within the terminal. The continuous airflow can direct air down from street level towards the platform level of the terminal (see FIGS. 21, 23), then generally parallel to a train or train track along the platform (see FIG. 23), and finally back up from the platform level to the street level again (see FIGS. 22, 23). The air flow devices 12 can work in concert to create the continuous airflow, helping to cool the subway or train station terminal, and/or to eliminate pockets of stale air that have built up within the terminal. This cascading movement of air can especially be useful at night, when the air at the street level is cool, and fresh. During night, when there are fewer people, and the trains are not running, the air moving devices 12 can be operated at high speeds to help quickly cool the terminal area, and then be run at lower speeds during the daytime when the people in the terminal area.

With reference to FIG. 24, in some embodiments a plurality of air moving devices 12 can also be arranged such that some of the air moving devices 12 are angled to direct air in a cascading manner as described above, whereas other air moving devices 12 are angled to direct air downwardly. This arrangement of air moving devices 12 can advantageously be used in commercial areas, such as grocery stores. For example, as illustrated in FIG. 24, air can be directed in through a roof unit 164. Once the air is inside the building (e.g. grocery store), the air moving devices 12 can pick up the air and move it in a cascading manner within the store to cool and/or eliminate pockets of stale air. Some of the air moving devices 12 can be angled so as to direct the air in a downward manner, cooling areas such as aisles or other portions of the store that may need to be cooled. This combination of cascading and downward cooling can help to keep the store as fresh, and comfortable, as possible.

Additionally, moving air laterally and in a cascading manner can advantageously be used where it is not possible to use ductwork to achieve the same purpose, or where ductwork would be too expensive or too large. For example, often the clearance within a commercial or manufacturing building's roof is not suitable for use of ductwork. The ductwork for such buildings can be costly, and can incorporate multiple pipes or other structures which accumulate losses. Ductwork is also often not available for areas in which people are waiting in line (e.g. waiting to get into rides as described above). In some large industrial buildings, manufacturing processes such as blow molding are used. These processes generate large amounts of heat (e.g. in the form of a heat plume) that need to be moved to other areas of the building to prevent electronics in the area (e.g. near the ceiling) from melting and/or otherwise being damaged. In these areas ductwork is also often not appropriate because the runs may be 500 feet or more. The ductwork would need to be very large, and the motors would need to be very large as well in order to move propel the air, resulting in high cost. Additionally, the ceilings of these buildings are often filled with conveyers and other objects that would make such large ductwork unfeasible. Thus, using a plurality of air moving devices 12, which cascade the air as described above, would be advantageous alternatives for ductwork in these and the other structures and setting described above.

Although the present invention has been described with a certain degree of particularity, it is understood that the present disclosure has been made by way of example and that changes in details of structure may be made without departing from the spirit thereof.

What is claimed is:

1. An air moving system comprising:
   an air moving device comprising:
      a housing having an air inlet and an air outlet,
      a fan disposed within the housing, and
      a stator hub disposed within the housing and having a plurality of circumferentially spaced vanes;
   a can configured to be mounted above a ceiling, the can comprising an open can bottom and a closed can top defining a downward opening, circumferentially extending channel, the air moving device configured to be positioned at least partially within the can, wherein the air outlet extends at least partially out of the can; and
   a grill configured to be mounted to the ceiling and coupled to an exterior surface of the housing of the air moving device, the grill comprising a plurality of spaced openings configured to allow air to flow up from the room and into the air inlet.

2. The air moving system of claim 1, wherein the plurality of spaced openings are positioned between fins.

3. The air moving system of claim 1, wherein the grill further comprises an outer ring fastened to the an underside of the ceiling.

4. The air moving system of claim 1, wherein the grill further comprises an inner ring configured to receive the air outlet portion of the air moving device.

5. The air moving system of claim 1, wherein the can further comprises an outwardly extending bottom flange that is configured to fit against an underside of the ceiling.

6. The air moving system of claim 1, wherein the can has a plurality of circumferentially spaced bottom openings that extend up a wall of the can.

7. The air moving system of claim 5, further comprising a plurality of clamping members corresponding to the plurality of circumferentially spaced bottom openings, the plurality of clamping members configured to be inserted into the plurality of circumferentially spaced bottom openings.

8. An air moving system comprising:
   an air moving device having an air inlet and an air outlet;
   a can configured to be mounted above a ceiling, the can comprising an open can bottom and a closed can top, the air moving device configured to be positioned at least partially within the can, wherein the air outlet extends at least partially out of the can; and
   a grill configured to be mounted to the ceiling and coupled to an exterior surface of the housing of the air moving device, the grill comprising a plurality of spaced openings configured to allow air to flow up from the room and into the air inlet.

9. The air moving system of claim 8, wherein the closed can top defines a downward opening, circumferentially extending channel.

10. The air moving system of claim 8, wherein the plurality of spaced openings are positioned between fins.

11. The air moving system of claim 8, wherein the grill further comprises an outer ring fastened to the an underside of the ceiling.

12. The air moving system of claim 8, wherein the grill further comprises an inner ring configured to receive the air outlet portion of the air moving device.

13. The air moving system of claim 8, wherein the can further comprises an outwardly extending bottom flange that is configured to fit against an underside of the ceiling.

14. The air moving system of claim 8, wherein the can has a plurality of circumferentially spaced bottom openings that extend up a wall of the can.

15. The air moving system of claim 14, further comprising a plurality of clamping members corresponding to the plurality of circumferentially spaced bottom openings, the plurality of clamping members configured to be inserted into the plurality of circumferentially spaced bottom openings.

\* \* \* \* \*